US009609201B2

United States Patent
Nakamura

(10) Patent No.: US 9,609,201 B2
(45) Date of Patent: Mar. 28, 2017

(54) FOCUS ADJUSTMENT APPARATUS, FOCUS ADJUSTMENT METHOD, PROGRAM AND IMAGE PICKUP APPARATUS

(71) Applicant: CANON KABUSHIKI KAISHA, Tokyo (JP)

(72) Inventor: Shun Nakamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/731,959

(22) Filed: Jun. 5, 2015

(65) Prior Publication Data
US 2015/0358530 A1    Dec. 10, 2015

(30) Foreign Application Priority Data
Jun. 9, 2014    (JP) .................................. 2014-118661

(51) Int. Cl.
*H04N 5/232*    (2006.01)
*G02B 7/34*    (2006.01)

(52) U.S. Cl.
CPC ........... *H04N 5/23212* (2013.01); *G02B 7/34* (2013.01); *H04N 5/23293* (2013.01)

(58) Field of Classification Search
None
See application file for complete search history.

(56) References Cited

U.S. PATENT DOCUMENTS

| 5,654,790 | A | * | 8/1997 | Uchiyama | ................ | G02B 7/36 |
| | | | | | | 396/123 |
| 2009/0115882 | A1 | * | 5/2009 | Kawarada | ................ | G03B 7/28 |
| | | | | | | 348/340 |

FOREIGN PATENT DOCUMENTS

| JP | 08-015603 A | 1/1996 |
| JP | 09-054242 A | 2/1997 |
| JP | 2001-004914 A | 1/2001 |
| JP | 2001-083407 A | 3/2001 |

* cited by examiner

Primary Examiner — Mark T Monk
(74) Attorney, Agent, or Firm — Cowan, Liebowitz & Latman, P.C.

(57) ABSTRACT

To achieve focusing suitable for a perspective-conflict object in AF control using a phase difference detection method, a focus adjustment apparatus detects a defocus amount of an image pickup optical system based on plural image signals generated from an exit pupil of the system, sets plural areas including a predetermined area used for focus adjustment of the system as areas of the plural image signals used for detecting the defocus amount, generates a focus adjustment signal for performing the focus adjustment based on the defocus amount detected in the predetermined area, and determines whether a perspective conflict occurs in the predetermined area according to the defocus amount detected in each set area. If the perspective conflict occurs in the predetermined area, the area used for the focus adjustment is changed from the predetermined area to any of other set areas, according to the defocus amount detected from each area.

19 Claims, 27 Drawing Sheets

FIG. 2A

PIXEL CONFIGURATION NOT CORRESPONDING TO IMAGE PICKUP PLANE PHASE DIFFERENCE AF

FIG. 2B

PIXEL CONFIGURATION CORRESPONDING TO IMAGE PICKUP PLANE PHASE DIFFERENCE AF

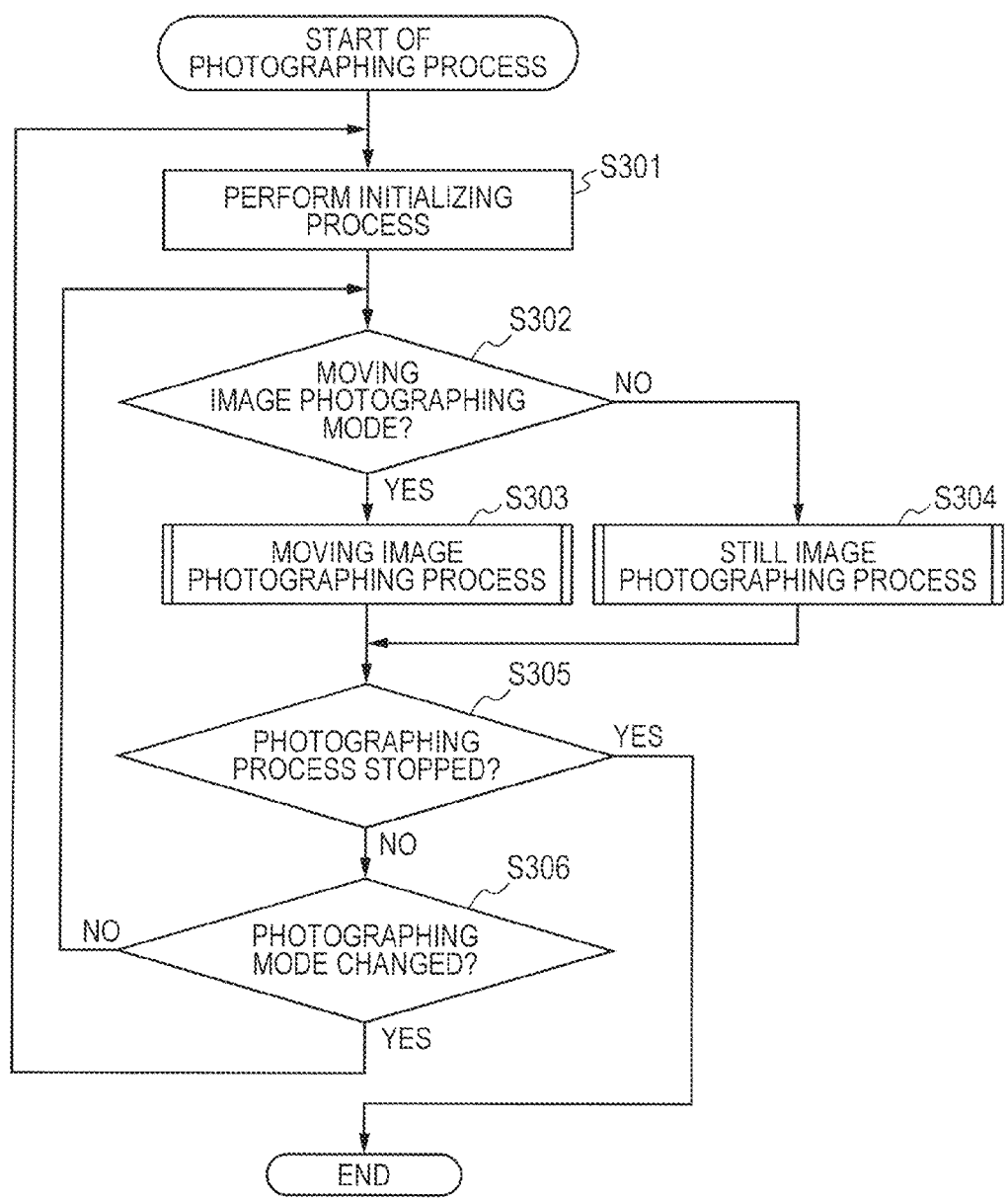

FIG. 17A   PICKED-UP SCREEN
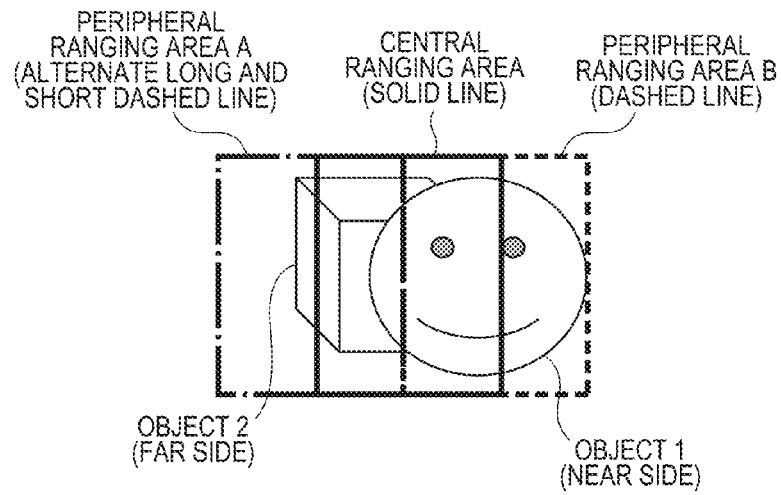
FIG. 17B   PICKED-UP SCREEN
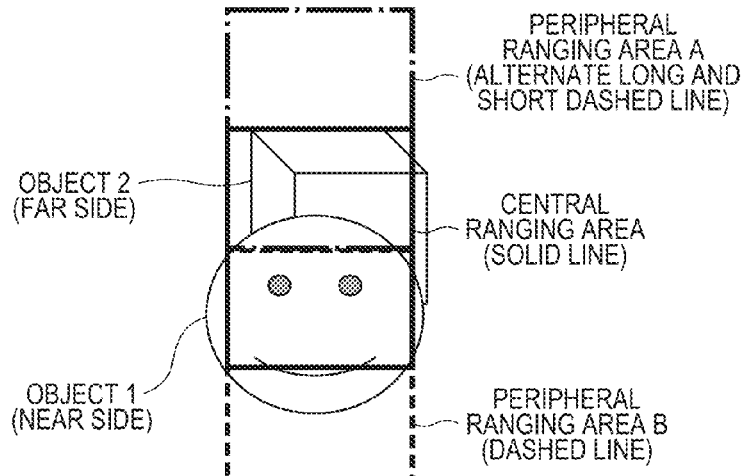

FOCUS ADJUSTMENT APPARATUS, FOCUS ADJUSTMENT METHOD, PROGRAM AND IMAGE PICKUP APPARATUS

BACKGROUND OF THE INVENTION

Field of the Invention

The present invention relates to a focus adjustment apparatus a focus adjustment method, and a program for performing the focus adjustment method. In particular, the present invention relates to a focus adjustment apparatus and a focus adjustment method which perform a focus adjustment by an image pickup place phase difference or (auto focus) method, a program which performs the focus adjustment method, and an image pickup apparatus to which the focus adjustment apparatus and method are applicable.

Description of the Related Art

Recently, in an image pickup apparatus which is typified by a single-lens reflect camera, the weight of a photographing method to be performed while a user is watching an LV (live view) screen has been highly increased. In this connection, various AF methods which have been proposed to be used for the image pickup apparatus mainly include a phase difference detection method and a contrast detection method.

In the phase difference detection method, light fluxes which passed through mutually different exit pupil areas in an image pickup optical system are imaged on a pair of line sensors for photometry, a defocus amount of the image pickup optical system is calculated by a phase difference of a pair of image signals obtained by the pair of line sensors, and an in-focus state is obtained by moving a focus lens by a movement amount corresponding to the calculated defocus amount (Japanese Patent Application Laid-Open No. H09-054242). However, since the optical path to the imaging element is blocked in the above phase difference detection method using the line sensors, this method basically makes the photographing performed while watching the LV screen difficult.

In the contrast detection method, an in-focus state is obtained by, while moving a focus lens, searching for the focus lens position at which a contrast evaluation value generated from an image signal obtained using an imaging element becomes maximum (Japanese Patent Application Laid-Open No. 2001-004914). Since the contrast detection method is suitable for AF in the LV photographing because the focusing is performed based on the image signal, this method is the best mainstream method in the LV photographing recently. However, in the contrast detection method, it is impossible to easily determine focus position and direction for obtaining an in-focus object. Consequently, in this method, there are cases where it takes a time for obtaining the in-focus state, the direction for the focusing is erroneously determined, and the focus position overreaches the in-focus position. These cases decrease focusing accuracy.

The recently demanded photographing performed while watching the LV screen is used for not only a still image but also a moving image. For this reason, when AF control is performed, in addition to responsiveness for quick focusing, accuracy is required in a focusing operation. In this connection, an AF method which can accurately perform the focusing at high speed in the LV photographing has been proposed recently. As an example of the AF method, there is an image pickup plane phase difference detection method by which the above phase difference detection method is performed on the imaging element plane (surface).

As one kind or the image pickup plane phase difference detection method, a method of simultaneously performing imaging and focus detection by performing pupil division of imaging pixels of an imaging element with a microlens and receiving a light flux from each divided pupil with a plurality of focus detection pixels has been proposed. In Japanese Patent Application Laid-Open No. 2001-083407, in one pixel (unit pixel), a photodiode which receives light collected by a microlens is divided, and thus light of a different pupil surface of an imaging lens is received by each photodiode. Therefore, by comparing the outputs of the two photodiodes, it is possible to perform the image pickup plane phase difference detection method. Consequently, by using the image pickup plane phase difference detection method, it is possible to perform AF using the phase difference detection method even in the LV photographing, and it is thus possible to accurately perform the focusing at high speed.

As one of objects for which it is difficult to perform AF, there is a perspective-conflict object which includes a plurality of objects respectively having different object distances in a ranging area (i.e., a distance measurement area). If the perspective-conflict object is photographed by the phase difference detection method or the image pickup plane phase difference detection method, as illustrated in FIGS. 15A and 15B, there is a problem that both near-side and far-side objects are out of focus and thus AF is completed with such out of focus. Japanese Patent Application Laid-Open No. H08-015603 proposes an AF method to be performed according to the phase difference detection. In this method, when it is determined that a perspective conflict occurs in objects, a ranging area is divided and the phase difference detection is again performed, and a defocus amount is calculated in the ranging area in which the perspective conflict does not occur.

However, as disclosed in Japanese Patent Application Laid-Open No. H08-015603, when the ranging area is divided based on the phase difference detection result and the phase difference detection is again performed, time that elapses before the completion of AF is prolonged by the amount of time necessary for repetition of the phase difference detection. Thus, a problem that responsiveness for AF deteriorates occurs. Moreover, in a case where objects respectively having different object distances exist above and below in a line sensor as illustrated in FIG. 16, when the proposed method is used, since a perspective conflict cannot be detected, focusing is performed with out of focus. As just described, in the case where the perspective-conflict objects exist in the divisional and vertical directions of the line sensor, it is impossible to improve problems.

The present invention, which has been completed in consideration of the above conventional problems, aims to achieve the focusing which is suitable for the perspective-conflict object in the AF control using the phase difference detection method.

SUMMARY OF THE INVENTION

In order to achieve the above object, a focus adjustment apparatus according to the present invention comprises: an obtaining unit configured to obtain a plurality of image signals generated by photoelectrically converting object light which passed through different division areas of an exit pupil of an image pickup optical system; a detection unit configured to detect a defocus amount of the image pickup optical system on the basis of the plurality of image signals obtained by the obtaining unit; an area setting unit configured to set a plurality of areas including a predetermined area to be used for a focus adjustment of the image pickup optical system, as areas of the plurality of image signals to be used for detecting the defocus amount; a control unit configured to generate a focus adjustment signal for performing the focus adjustment of the image pickup optical system, on the basis of the defocus amount detected in the predetermined area; and a perspective conflict determination unit configured to determine whether or not a perspective conflict occurs in the predetermined area, according to the defocus amount detected in each area set by the area setting unit, wherein, in a case where it is determined by the perspective conflict determination unit that the perspective conflict occurs in the predetermined area, the control unit changes the area to be used for the focus adjustment of the image pickup optical system from the predetermined area to any of other areas set by the area setting unit, according to the defocus amount detected from each area.

According to the present invention, it is possible to achieve the focusing suitable for the perspective-conflict object in the AF control using the phase difference detection method.

Further features of the present invention will become apparent from the following description of exemplary embodiments with reference to the attached drawings.

BRIEF DESCRIPTION OF THE DRAWINGS

FIGS. 2A and 2B are diagrams respectively illustrating examples of a pixel configuration not corresponding to an image pickup plane phase difference detection method and a pixel configuration corresponding to the image pickup plane phase difference detection method.

FIG. 3 is a flow chart indicating an operation of a photographing process to be performed by the image pickup apparatus according to the first embodiment.

FIGS. 17A and 17B are diagrams illustrating examples of arrangements of central and peripheral ranging areas set by the focus adjustment apparatus according to the first embodiment and examples of perspective-conflict objects.

DESCRIPTION OF THE EMBODIMENTS

Hereinafter, exemplary embodiments of the present invention will be described in detail with reference to the attached drawings. Incidentally, since the embodiments described hereinafter are merely exemplifications, the present invention is not limited to the constitutions and the configurations respectively described in the following embodiments.

First Embodiment

Figure 1:
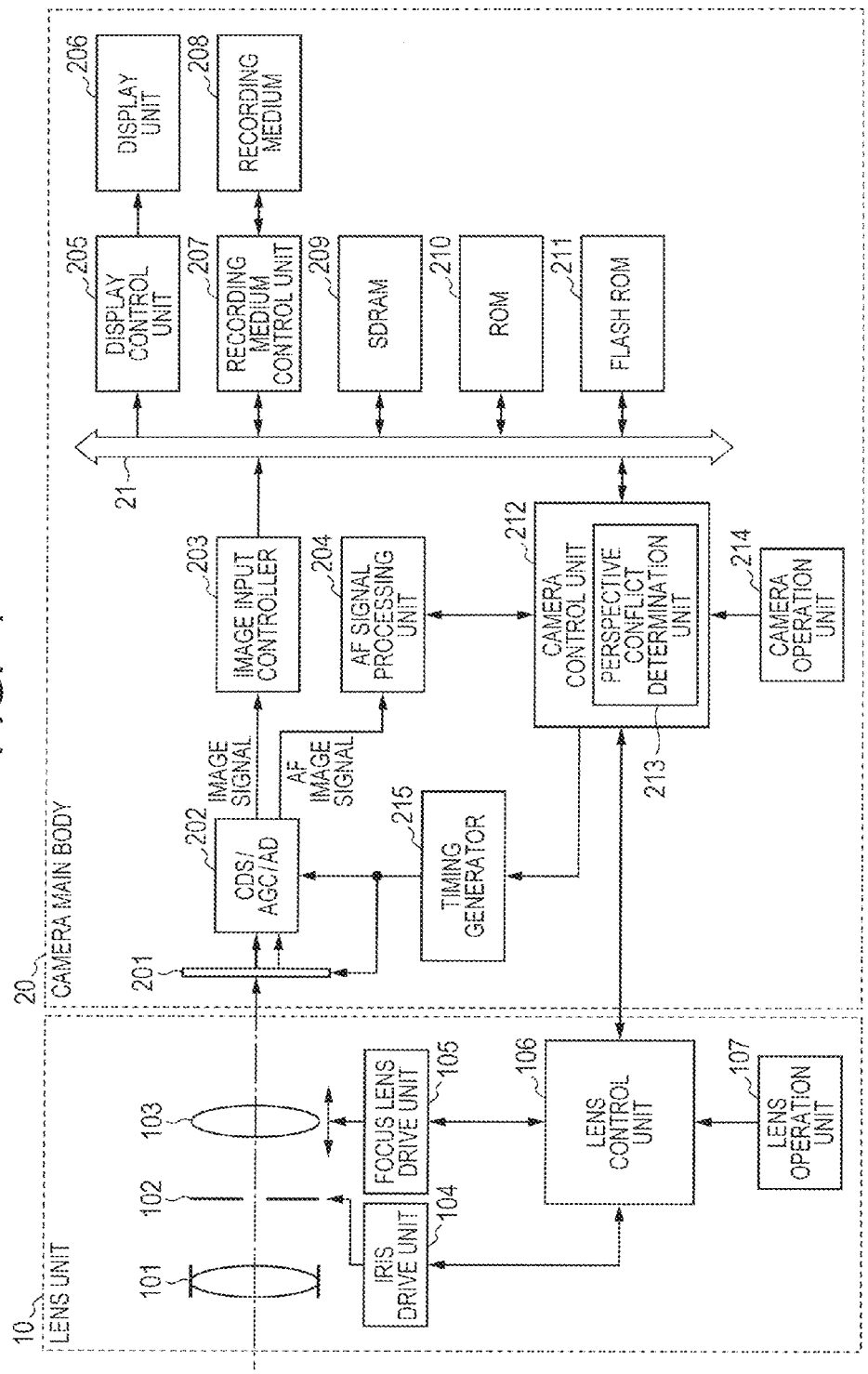
FIG. 1 is a block diagram exemplarily illustrating a functional constitution of an interchangeable lens camera which is an example of an image pickup apparatus to which a focus adjustment apparatus according to a first embodiment of the present invention is applied.

FIG. 1 is a block diagram exemplarily illustrating a functional constitution of an interchangeable lens camera which is an example of an image pickup apparatus according to the first embodiment of the present invention.

The image pickup apparatus according to the present embodiment is constituted by an exchangeable lens unit 10 and a camera main body 20. A lens control unit 106 which totally controls the operations of all lenses and a camera control unit 212 which totally controls the operations of the whole camera system including the lens unit 10 can mutually communicate with each other via the terminal provided on the lens mount.

Initially, the constitution of the lens unit 10 will be described. A fixed lens 101, a diaphragm 102 and a focus lens 103 together constitute an image pickup optical system which terms an optical image of an object. The diaphragm 102, which is driven by a diaphragm drive unit 104, controls an amount of light incident on a later-described imaging element 201. The focus lens 103 is driven by a focus lens drive unit 105, and the in-focus distance of the image pickup optical system is changed according to the position of the focus lens 103. The diaphragm drive unit 104 and the focus lens drive unit 105, which are controlled by the lens control unit 106, decide the aperture amount of the diaphragm 102 and the position of the focus lens 103.

A lens operation unit 107 is an input device group by which a user performs setting concerning the operation of the lens unit 10. More specifically, by using the lens operation unit, the user changes a mode between an AF (auto focus) mode and an MF (manual focus) mode, sets a photographing distance range, and sets an image stabilization mode. When the lens operation unit 107 is operated, the lens control unit 106 performs control according to the operation.

The lens control unit 106 controls the diaphragm drive unit 104 and the focus lens drive unit 105 in response to a control instruction and/or control information received from the later-described camera control unit 212, and transfers lens control information to the camera control unit 212.

Next, the constitution of the camera main body 20 will be described. The camera main body 20 is constituted so as to be able to obtain an image signal from a light flux passed through the image pickup optical system of the lens unit 10.

The imaging element 201 is constituted by a CCD (charge-coupled device) and a CMOS (complementary metal-ozide semiconductor) sensor. Object light incident from the image pickup optical system of the lens unit 10 is formed as an image on the light reception surface of the imaging element 201, and then converted into a signal electric charge according to the incident light amount by a photodiode provided in the pixel arranged on the imaging element 201. The signal electric charges accumulated in the respective photodiodes are sequentially read from the imaging element 201 as voltage signals according to the signal electric charges in response to a drive pulse output by a timing generator 215 according to an instruction from the camera control unit 212.

In the imaging element 201 of the present embodiment, the two photodiodes are provided in one pixel (unit pixel), and the image signal to be used for automatic focus adjustment by an image pickup plane phase difference detection method (hereinafter, called an image pickup plane phase difference AF) can be generated. FIG. 2A schematically illustrates an example of a pixel configuration which does not correspond to the image pickup plane phase difference AF, and FIG. 2B schematically illustrates an example of a pixel configuration which corresponds to the image pickup plane phase difference AF. Here, it is assumed that, in both the examples, a Bayer-arranged primary color filter is used.

In the pixel configuration of FIG. 2B corresponding to the image pickup plane phase difference AF, the unit pixel in FIG. 2A is divided into two in the paper-based lateral direction, and the two photodiodes (light reception areas) A and B are provided. Incidentally, it should be noted that the division method illustrated in FIG. 2B is merely the example. Namely, it is possible to use another division method, and it is also possible to apply a different division method for each pixel.

The light flux incident on each pixel is separated by each microlens of the microlens array, and the separated light is photoelectrically converted by the two photodiodes provided in the pixel, so that the two signals to be used for image pickup and AF can be obtained for each pixel. That is, the microlens array functions as a pupil division unit for an exit pupil of the image pickup optical system. More specifically, the signals (A, B) obtained by receiving the object light passed through the different pupil division areas respectively with the two photodiodes A, B (A pixel, B pixel) in the pixel are the two image signals for AF, and the signal (A+B) obtained by adding these signals is the image signal. Incidentally, as a pair of image signals to be used for normal (or ordinary) phase difference detection AF is generated by a pair of line sensors having a plurality of pixels, the pair of image signals to be used in the image pickup plane phase difference AF is obtained from the outputs of the A pixel and the B pixel of each of the plurality of unit pixels. Then, correlation calculation is performed to the two image signals by using the AF signal in a later-described AF signal processing unit 204, thereby calculating an image shift amount and various reliability information.

A CDS/AGC/AD converter (correlated double sampler/automatic gain controller/analog-to-digital converter) 202 performs correlated double sampling, gain control and analog-to-digital conversion for eliminating a reset noise in regard to the image signal and the AF signal respectively read from the imaging element 201, and then generates image data. The CDS/AGC/AD converter 202 outputs the obtained picked-up image data to an image input controller 203, and further outputs the image data for image pickup plane phase difference AF to the AF signal processing unit 204.

The image input controller 203 stores the image data output from the CDS/AGC/AD converter 202 in an SDRAM (synchronous dynamic random access memory) 200 via a bus 21. The image data stored in the SDRAM 209 is read by a display control unit 205 via the bus 21, and the read image data is displayed on a display unit 206. In an operation mode of recording the image data, the image data stored in the SDRAM 209 is recorded on a recording medium 208 by a recording medium control unit 207.

Incidentally, the control programs to be executed by the camera control unit 212, various data necessary for control and the like have been stored in a ROM (read only memory) 210, and various kinds of setting information such as user setting information and the like concerting the operations of the camera main body 20 have been stored in a flash ROM 211.

The AF signal processing unit 204 performs a correlation operation in regard to the two image data for AF output from the CDS/AGC/AD converter 202, thereby calculating an image shift amount and reliability information (a degree of conformity between two images, steepness, contrast information, saturation information, defect information, and the like). Further, the AF signal processing unit sets and arranges a ranging area for AF in the picked-up screen. The present invention is characterized in that at least three ranging areas are arranged, and the image shift amount and the reliability information are calculated for each of the arranged ranging areas. The AF signal processing unit 204 outputs the image shift amount and the reliability information calculated for each ranging area to the camera control unit 212.

The camera control unit 212 changes the setting of the AF signal processing unit 204 according to the image shift amount and the reliability information obtained by the AF signal processing unit 204. For example, if the image shift amount is equal to or larger then a predetermined amount, the area for which the correlation operation is performed is set widely. Besides, a kind of band-pass filter is changed according to the contrast information. In any case, the detail of the correlation operation will be described later with reference to FIGS. 7A to 10B.

Although the three signals which consist of the image (pickup) signal and the two image signals for AF are obtained from the imaging element 201 in the present embodiment, the present invention is not limited to this method. For example, in consideration of a load applied to the imaging element 201, it may be possible to take two signals consisting of one image signal and one image signal for AF and use the difference between the taken image signal and image signal for AF as another image signal for AF.

The camera control unit 212 performs the entire control by exchanging the information with the respective functional blocks in the camera main body 20. In addition to the process in the camera main body 20, the camera control unit 212 performs, according to inputs from a camera operation unit 214, various camera functions such as power ON/OFF, a setting change, a recording start, an AF control start, recorded-video confirmation and the like in response to user's instructions. Further, the camera control unit 212 transfers the control instruction and the control information concerning the lens unit 10 to the lens control unit 106, and obtains the information concerning the lens unit 10 from the lens control unit 106. Furthermore, as described later, the camera control unit 212 determines by a perspective conflict determination unit 213 whether or not a perspective conflict occurs in a ranging frame.

The camera control unit 212, which is, e.g., one or more programmable processors, executes the control programs stored in, e.g., the ROM 210, thereby achieving the operations of the whole camera system including the lens unit 10. For example, the process operations shown in later-described respective flow charts are achieved under the condition that the camera control unit 212 controls the respective blocks of the camera by executing the above control programs.

The perspective conflict determination unit 213, which is the characteristic portion of the present invention, functions as a part of the camera control unit 212, and determines whether or not a plurality of objects respectively positioned at different distances from the camera exist in a ranging area (that is, whether or not a perspective conflict occurs). The camera control unit 212 generates the drive signal of the focus lens 103 via the lens control unit 106, based on the correlation operation result for specific one of the plurality of ranging areas obtained from the AF signal processing unit 204. Here, it is assumed that the ranging area to be selected this time is the ranging area of which the center is at the position set by the user via the camera operation unit 214. However, the perspective conflict determination unit 213 determines whether or not the perspective conflict occurs in the ranging area arranged at the relevant center, based on the correlation operation for each ranging area obtained from the AF signal processing unit 204. If it is determined by the perspective conflict determination unit 213 that the perspective conflict occurs in the ranging area arranged at the relevant center, the camera control unit 212 controls to drive the focus lens 103 via the lens control unit 106 based on the correlation operation results of the ranging areas other than the ranging area arranged at the relevant center.

Incidentally, although the arrangement position of the ranging area is set by the user via the camera operation unit 214 in the present embodiment, the present invention is not limited to this method. For example, if a constitution of detecting the specific object from the picked-up screen is further provided, it may be possible to set the arrangement position of the ranging area based on the object detection result.

Figure 15A:
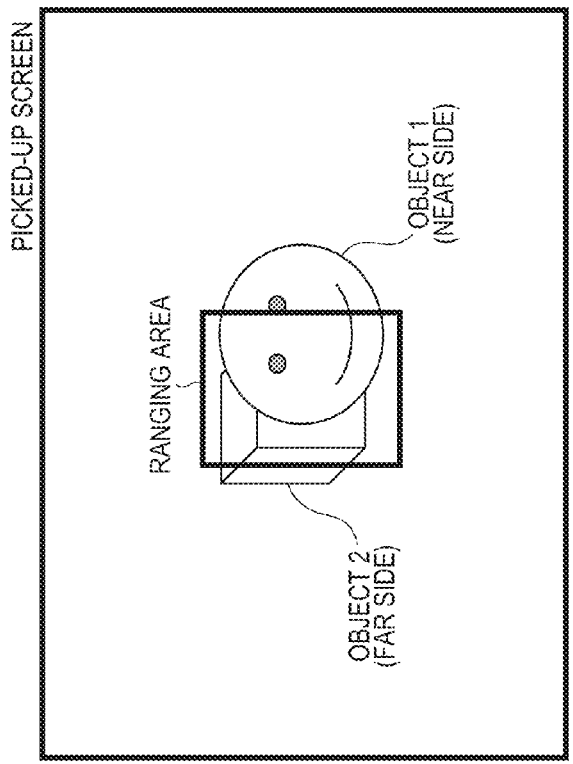
FIGS. 15A and 15B are diagrams illustrating examples of a state that a perspective conflict occurs and false in-focusing which occurs due to the perspective conflict.
Figure 15B:
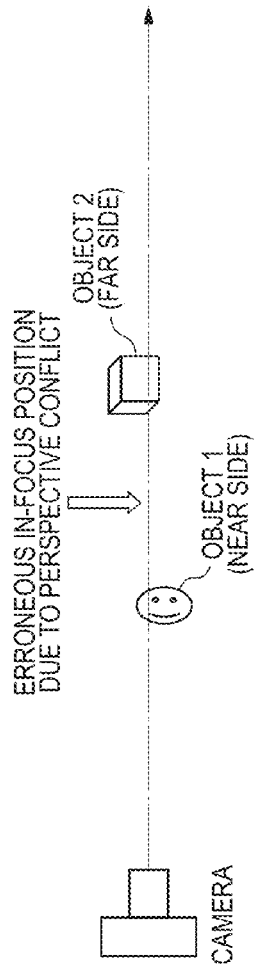
Figure 16:
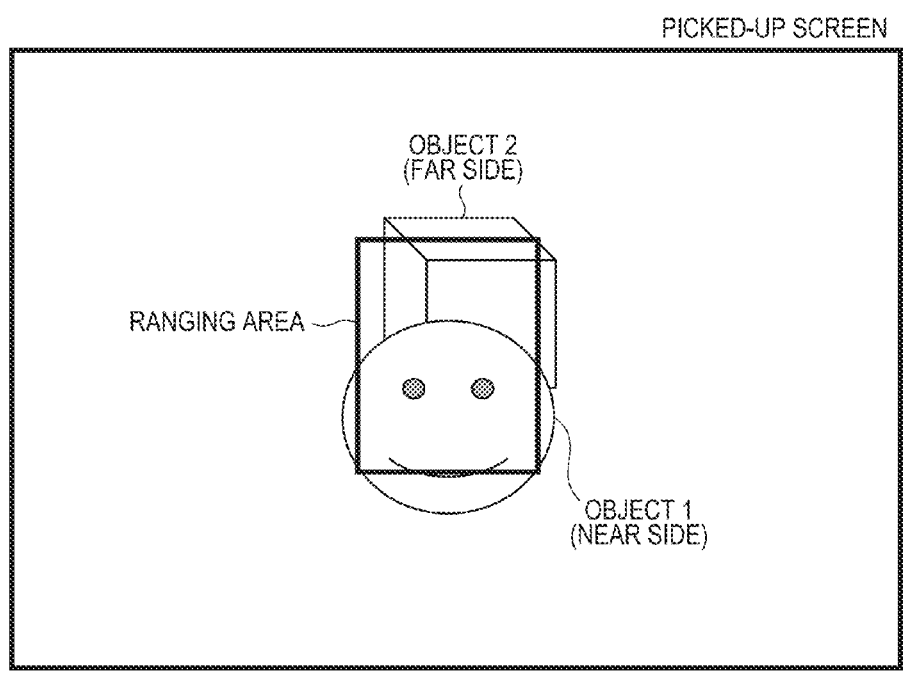
FIG. 16 is a diagram illustrating an example of a state that a perspective conflict occurs such that an object is shifted longitudinally.

FIGS. 15A and 15B are the diagrams schematically illustrating the positional relation of the near-side object and the far-side object in the case where the perspective conflict occurs. In the AF system to which the phase difference detection method is adopted, when the perspective conflict occurs, there is a problem that the in-focus state is erroneously determined irrespective of the state that both the objects are out of focus, and thus the AF operation is ended. This is because, in the correlation operation, the correlation amount at the intermediate distance between the object distances of the near-side and far-side objects reaches a maximum. Further, when the focus lens is positioned at the intermediate position between the near-side and far-side object distances, since the near-side and far-side objects of which the defocus directions are different exist, a defocus amount becomes small at the balanced intermediate position, so that the in-focus state is erroneously determined.

To solve this problem, it is necessary to avoid the state that the objects respectively having the different distances from the camera exist in the ranging area for which the phase difference detection is performed. That is, it is desirable to have the state that only the object having one distance exists in the ranging area.

Incidentally, even in the case where the objects by which the perspective conflict occurs exist in the ranging area, it is possible, by detecting whether the perspective conflict occurs in the visual field and controlling to perform the AF for the ranging area avoiding the perspective-conflict ranging area, to perform in-focus photographing to the object which was erroneously determined as being in focus in the past and thus photographed in the condition of being out of focus. The perspective conflict determination unit 213 in the present embodiment is provided to achieve such an object. In any case, the detail of the operation of the perspective conflict determination unit 213 will be described later with reference to flow charts for describing the control of the camera main body 20.

Subsequently, the operation of the camera main body 20 will be described with reference to FIGS. 3 to 14.

FIG. 3 is the flow chart indicating the operation of the photographing process to be performed by the camera main body 20. Initially, in S301, the camera control unit 212 performs an initializing process such as camera setting or the like, and the process is advanced to S302. In S302, the camera control unit 212 determines whether the photographing mode of the camera main body 20 is a moving image photographing mode or a still image photographing mode. Then, the process is advanced to S303 if the photographing mode is the moving image photographing mode, whereas the process is advanced to S304 if the photographing mode is the still image photographing mode. In S303, the camera control unit 212 performs a moving image photographing process, and the process is advanced to S305. The detail of the moving image photographing process in S303 will be described later with reference to FIG. 5. If it is determined in S302 that the photographing mode is the still image photographing mode, the camera control unit 212 performs a still image photographing process in S304, and the process is advanced to S305. Although the present invention is applicable to both the moving image photographing mode and the still image photographing mode, only a control example in the moving image photographing process of S303 will be described with reference to FIG. 4 in the present embodiment. Thus, the detail of the still image photographing process of S304 will be omitted.

In S305 after the moving image photographing process of S303 or the still image photographing process of S304, the camera control unit 212 determines whether or not the photographing process is stopped. If it is determined that the photographing process is not stooped, the process is advanced to S306. On the other hand, if it is determined that the photographing process is stopped, the photographing process is ended. Here, the time when the photographing process is stopped includes time when the power supply of the camera main body 20 is turned off via the camera operation unit 214, and time when operations other than the photographing such as user's camera setting, image reproduction for confirming photographed still and moving images, and the like are performed. In S306 after the determination of S305 that the photographing process was not stopped, the camera control unit 212 determines whether or not the photographing mode is changed. If it is determined that the photographing mode is changed, the process is returned to S301. On the other hand, if it is determined that the photographing mode is not changed, the process returned to S302. When the photographing mode is not changed, the camera control unit 212 continues to perform the process in the current photographing mode. On the other hand, when the photographing mode is changed, the camera control unit performs the process in the changed photographing mode after performing the initializing process in S301.

Subsequently, the operation to be performed in the moving image photographing process in S303 of FIG. 3 will be described with reference to FIG. 4. In S401 to S404, the camera control unit 212 performs control concerning moving image recording. More specifically, in S401, the camera control unit 212 determines whether or not a moving image record switch is on. Then, the process is advanced to S402 if the switch is on, whereas the process is advanced to S405 if the switch is not on. The camera control unit 212 determines in S402 whether or not the moving image is being recorded currently. Then, the moving image reading is started in S403 and the process is further advanced to S405 if the moving image is not being recorded, whereas the moving image recording is stopped in S404 if the moving image is being recorded. In the present embodiment, the moving image recording is started and stopped every time the moving image record switch is depressed. However, it may be possible to start and stop the moving image recording by a method or using different buttons respectively for record start and stop or a method of using a changeover switch.

In S405, the camera control unit 212 performs a focus state detecting process, and then the process is advanced to S406. The focus state detecting process is the process of obtaining defocus information and reliability information for the image pickup plane phase difference AF by the camera control unit 212 and the AF signal processing unit 204, and the detail of this process will be described with reference to FIG. 5.

After the focus state detecting process was performed in S403, the camera control unit 212 performs in S406 the perspective conflict determination which is the characteristic portion of the present invention, and the process is advanced to S407. In the perspective conflict determination, the perspective conflict determination unit 213 determines whether or not the perspective conflict occurs in the central ranging area. The detail of the perspective conflict determination will be described later with reference to the flow chart illustrated in FIG. 11.

After the perspective conflict determination was performed in S406, the camera control unit 212 selects in S407 the ranging area to be used, and the process is advanced to S408. More specifically, the ranging area to be used for focus adjustment is selected from the ranging areas set in the focus state detecting process of S405, according to the information indicating occurrence/non-occurrence of the perspective conflict in the central ranging area determined by the perspective conflict determination unit 213. The detail of the selection of the ranging area to be used will be described later with reference to the flow chart illustrated in FIG. 12.

After the ranging area selection was performed in S407, the camera control unit 212 determines in S408 whether or not in-focusing is being stepped currently. Then, the process is advanced to S409 if the in-focusing is not being stopped, whereas the process is advanced to S410 if the in-focusing is being stopped. In S409, the camera control unit 212 performs the process in the focus adjustment state (focusing state) if it is determined in S408 that the in-focusing is not being stopped, and then the moving image photographing process as ended. In S409, the focus adjustment control (focusing control) is performed based on the information obtained in S405 to S407, and the detail of the relevant process will be described later with reference to the flow chart illustrated in FIG. 13. If it is determined in S408 that the in-focusing is being stopped, the camera control unit 212 performs in S410 the process in the in-focus stop state, and then the moving image photographing process is ended. In S410, it is determined, in the state that the object is in focus, whether or not to again perform the focus adjustment control because of reasons that the main object has been moved or changed, and the detail of the relevant process will be described later with reference to the flow chart illustrated in FIG. 14.

Next, the focus state detecting process in S405 of FIG. 4 will be described with reference to FIG. 5. Initially, in S501, the AF signal processing unit 204 sets and arranges the ranging area for which the focus state detection is performed, from the focus detection range on the picked-up screen. The detail of the ranging area setting will be described later with reference to the flow chart illustrated in FIG. 6.

Next, in S502, the AF signal processing unit 204 obtains a pair of image signals for AF from the pixel included in the set ranging area. Then, in S503, the AF signal processing unit 204 calculates the correlation amount between the obtained image signals. Then, in S504, the AF signal processing unit 204 calculates a correlation change amount from the correlation amount calculated in S503. In S505, the AF signal processing unit 204 calculates an out-of-focus amount from the correlation change amount. Further, in S506, the AF signal processing unit 204 calculates the reliability indicating how far the out-of-focus amount is reliable. The above processes are performed for each ranging area existing in the focus detection range and set in S501. Then, in S507, the AF signal processing unit 204 converts the out-of-focus amount into a defocus amount for each ranging area, and the focus state detecting process is ended.

Next, the operation of the ranging area setting process in S501 of FIG. 5 will be described with reference to the flow chart illustrated in FIG. 6. Incidentally, in S601, the AF signal processing unit 204 sets the ranging area to the position for which the focus state detection is performed, according to the information which takes the current set mode of AF frame and the position of display frame into consideration and is obtained from the camera control unit 212. Hereinafter, the ranging area set in S601 will be called a central ranging area so as to be distinguished from a later-described peripheral ranging area. In S602 after the setting of the central ranging area of S601, a peripheral ranging area A is set at the position which is on the periphery of the central ranging area and from which the center of visual field of the central ranging area is shifted, and the process is advanced to S603. In S603, another peripheral ranging area B is set at the position which interposes the center of visual field of the central ranging area set in S601 with the center of visual field of the peripheral ranging area A set in S602, and the ranging area setting process is ended. For example, ranging areas arranged as illustrated in FIGS. 17A and 17B correspond to the ranging areas set in S601 to S603. As just described, the present embodiment is characterized in that at least the two peripheral ranging areas which interpose the central ranging area with each other are arranged, so that at least the three ranging areas are set. Then, the perspective conflict determination for the central ranging area is performed based on the defocus amounts and the reliability information of at least the above three ranging areas.

Incidentally, when the perspective conflict determination and the focus adjustment (focusing) are performed, it is desirable to set the central and peripheral ranging areas so as to partially overlap each other. However, even if these areas are arranged so as not to overlap each other, such an arrangement does not depart from the spirit and scope of the present invention.

Next, the focus state detecting process described in FIG. 5 will further be described in detail with reference to FIGS. 7A to 10B.

Figure 7A:
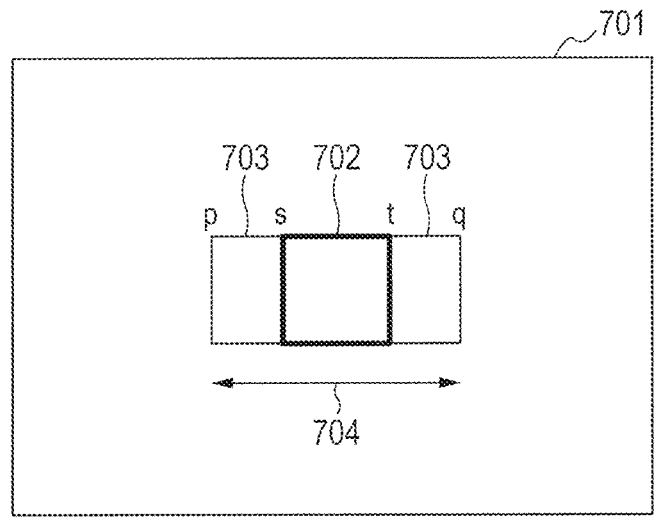
FIGS. 7A and 7B are schematic diagrams illustrating examples of ranging areas to be treated in the focus state detecting process of FIG. 5.
Figure 7B:
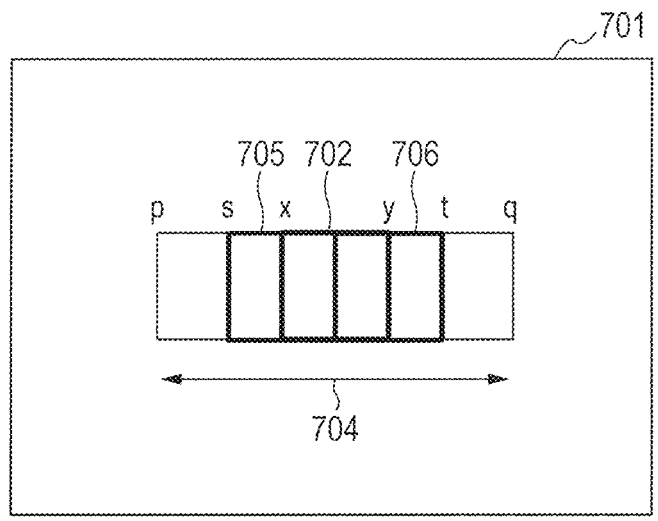

FIGS. 7A and 7B are the schematic diagrams illustrating examples of the ranging areas to be treated in the focus state detecting process.

FIG. 7A exemplarily illustrates a ranging area 702 in a pixel array 701 of the imaging element 201. Here, since shift areas 703 are necessary for the correlation operation, an area 704 consisting of the ranging area 702 and the shift areas 703 is the pixel area necessary for the correlation operation. In the drawings, p, q, s and t correspond to the coordinates on the x-axis. More specifically, p and q respectively indicate the X coordinates of the start and end points of the pixel area 704, and s and t respectively indicate the x coordinates of the start and end points of the ranging area 702.

FIG. 7B exemplarily illustrates a plurality of ranging areas 705 and 706 which are arranged in addition to the ranging area 702 of FIG. 7A. Here, the ranging areas 702, 705 and 706 respectively correspond to the ranging areas which were described as the central ranging area, the peripheral ranging area A and the peripheral ranging area B in FIG. 17A. In the present embodiment, the perspective conflict is determined for the central ranging area by calculating the out-of-focus amount for each of the plurality of set ranging areas, and the out-of-focus amount according to the result of the perspective conflict determination and the reliability is used. Incidentally, the arrangement, the largeness and the like of the ranging areas are not limited to those exemplarily described here. Namely, it is of course possible to use other arrangement, largeness and the like of the ranging areas.

Figure 8A:
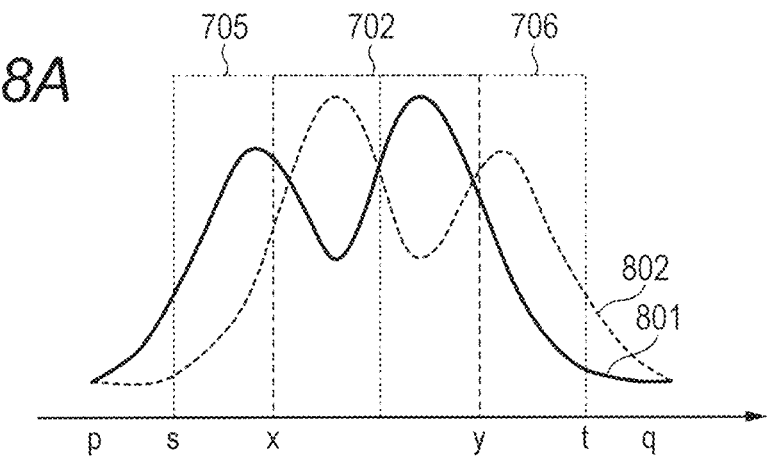
FIGS. 8A, 8B and 8C are diagrams illustrating examples of image signals obtained from the focus detection areas illustrated in FIGS. 7A and 7B.
Figure 8B:
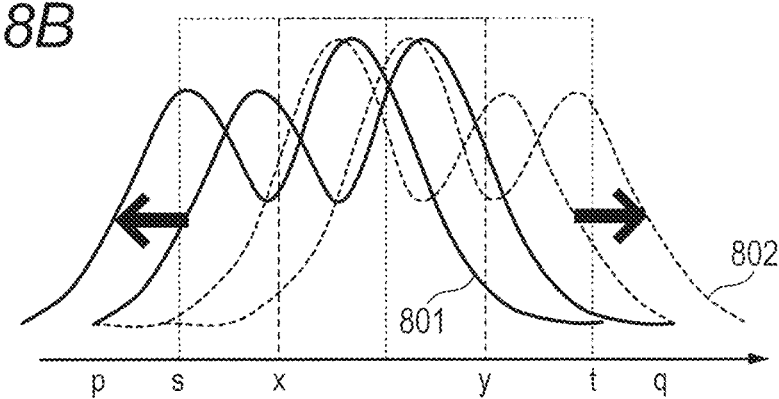
Figure 8C:
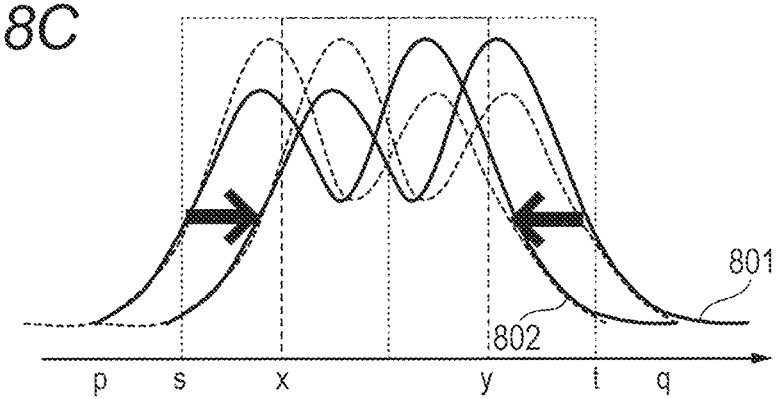

FIGS. 8A, 8B and 8C are diagrams exemplarily illustrating the image signals for AF respectively obtained from the pixels included in the ranging areas 702, 705 and 706 set in FIG. 7B. More specifically, a solid line 801 indicates an image signal A and a dashed line 802 indicates an image signal B.

FIG. 8A exemplarily illustrates the image signals before shift.

FIGS. 8B and 8C illustrate the states that the image signals are shifted respectively in the plus and minus directions in regard to the image waveforms before shift illustrated in FIG. 8A. When the correlation amount is calculated, both the image signal A 801 and the image signal B 802 are shifted in the directions indicated by the arrows bit by bit.

Subsequently, how to calculate the correlation amount COR will be described. First, as illustrated in FIGS. 8B and 8C, the image signal A 801 and the image signal B 802 are respectively shifted bit by bit, and the sum of one absolute values of the differences between the image signals A and B are calculated. At this time, the shift amount is i, the minimum shift amount is p−s, and the maximum shift amount is q−t. Further, x indicates the start coordinates of the ranging area 702, and y indicates the end coordinates of the ranging area 702. By using them, it is possible to calculate the correlation amount COR in the focus detection area 702 with the following expression (1).

$$COR[i] = \sum_{k=x}^{y} |A[k+i] - B[k-i]| \qquad (1)$$
$$= \{(p-s) < i < (q-t)\}$$

Figure 9A:
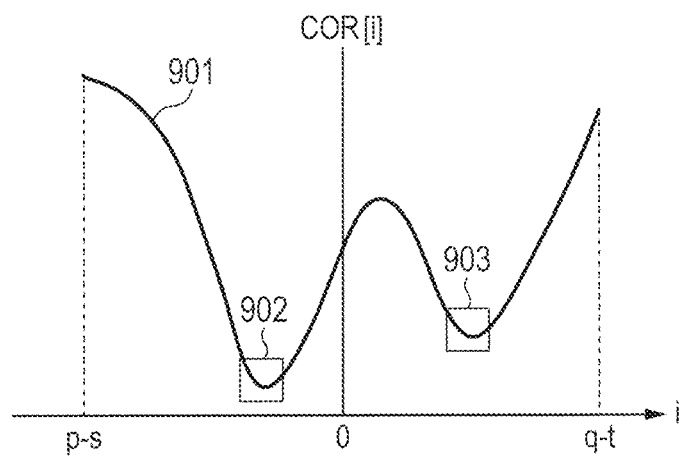
FIGS. 9A and 9B are diagrams illustrating examples of relations between the shift amount and the correlation amount of the image signals illustrated in FIGS. 8A to 8C.

FIG. 9A is the diagram exemplarily illustrating the relation between the shift amount and the correlation amount. In the drawing, the axis of abscissa indicates the shift amount, and the axis of ordinate indicates the correlation amount. More specifically, in extreme value vicinities 902 and 903 of a correlation amount waveform 901, the degree of conformity between the image signals A and B is higher at the vicinity of which the correlation amount is smaller.

Subsequently, now to calculate the correlation change amount ΔCOR will be described. First, in the correlation amount waveform of FIG. 9A, the correlation change amount is calculated from the difference between one-shift-skip correlation amounts. At this time, the shift amount is i, the minimum shift amount is p−s, and the maximum shift amount is q−t. By using them, it is possible to calculate the correlation change amount ΔCOR with the following expression (2).

$$\Delta COR[i] = COR[i-1] - COR[i+1]$$
$$\{(p-s+1) < i < (q-t-1)\} \qquad (2)$$

Figure 10A:
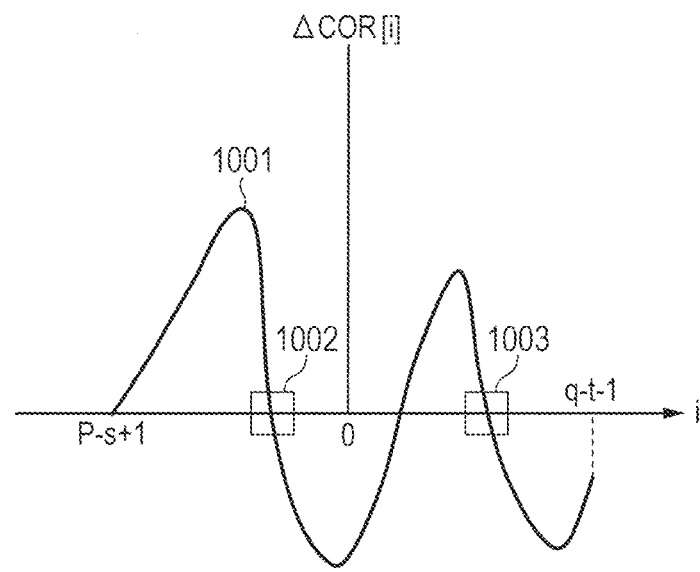
FIGS. 10A and 10B are diagrams illustrating examples of relations between the shift amount and the correlation change amount ΔCOR of the image signals illustrated in FIGS. 8A to 8C.

FIG. 10A is the diagram exemplarily illustrating the relation between the shift amount and the correlation change amount ΔCOR. In the drawing, the axis of abscissa indicates the shift amount, and the axis of ordinate indicates the correlation change amount. In a correlation change amount waveform 1001, the correlation change amount is changed from the plus amount to the minus amount at peripheral areas 1002 and 1003. The state that the correlation charge amount is "0" is called a zero cross in which the degree of conformity between the image signals is highest. The shift amount as the time of zero cross is the out-of-focus amount.

Figure 10B:
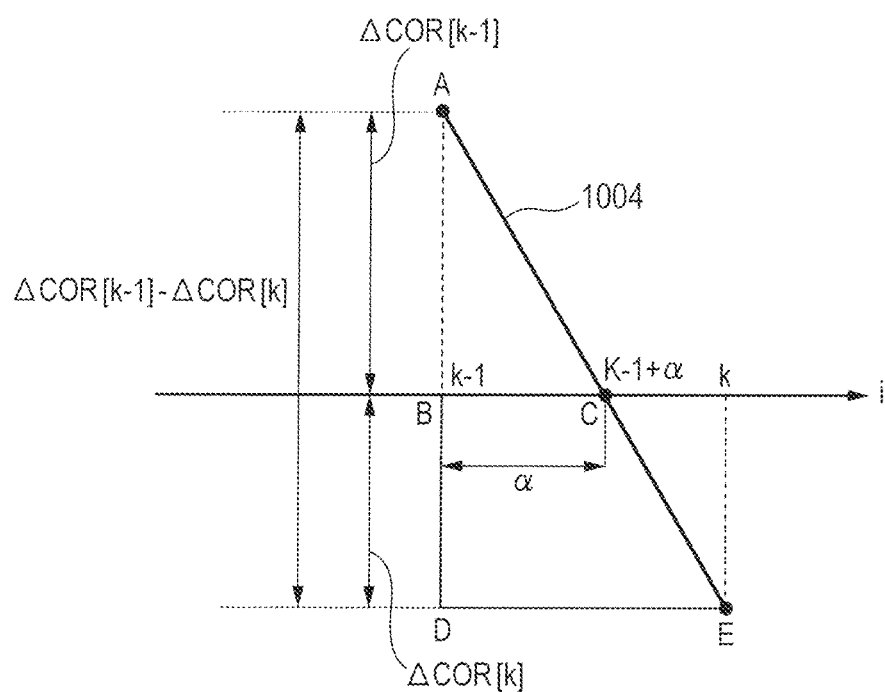

FIG. 10B illustrates the enlarged peripheral area 1002 of FIG. 10A. Here, a portion 1004 is a part of the correlation change amount waveform 1001. Hereinafter, how to calculate the out-of-focus amount PRD will be described with reference to FIG. 10B.

The shift amount (k−1+α) at the time of zero cross is divided into the integral portion β(=k−1) and the decimal portion α. From the relation of the similarity between the triangle ABC and the triangle ADE in the drawing, the decimal portion α can be calculated with the following expression (3).

$$AB:AD = BC:DE \quad (3)$$

$$\triangle COR[k-1]:\triangle COR[k-1] - \triangle COR[k] = \alpha:k - (k-1)$$

$$\alpha = \frac{\triangle COR[k-1]}{\triangle COR[k-1] - \triangle COR[k]}$$

Subsequently, the integral portion β can be calculated from FIG. 10B with the following expression (4)

$$\beta = k-1 \quad (4)$$

The out-of-focus amount PRD can be calculated from the sum of α and β.

Further, as illustrated in FIG. 10A, if the plurality of zero-cross shift amounts exist, the zero cross at which steepness of the correlation amount change is large is set to a first zero cross. Here, the steepness is the indicator concerning ease of AF. The higher the value of the steepness, the greater the accuracy and the ease of AF. In any case, the steepness maxder can be calculated with the following expression (5).

$$\max der = |\Delta COR[k-1]| + |\Delta COR[k]| \quad (5)$$

As described above, if the plurality of zero crosses exist, the first zero cross is determined based on the steepness.

Subsequently, how to calculate the reliability of the out-of-focus amount will be described. The reliability can be defined by the above steepness and the degree of conformity fnclvl between the image signals A and B (hereinafter, called the degree of conformity between two images). Here, the degree of conformity between two images is the indicator concerning accuracy of the out-of-focus amount. In the correlation operation of the present embodiment, the smaller the degree of coincidence between two images, the greater the accuracy of the out-of-focus amount.

Figure 9B:
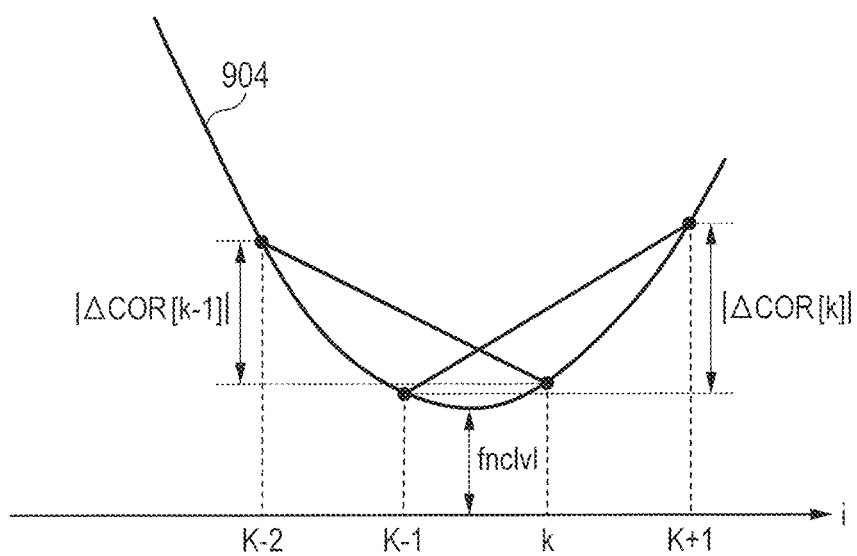

FIG. 9B illustrates the enlarged extreme value vicinity 902 of FIG. 9A, which shows a part 904 of the correlation amount waveform 901. Hereinafter, how to calculate the steepness and the degree of coincidence between two images will be described with reference to FIG. 9B.

The degree of conformity between two images fnclvl can be calculated with the following expression (6).

when $|\Delta COR[k-1]| \times 2 \leq \max der$      (i)

$$fnclvl = COR[k-1] + \Delta COR[k-1]/4$$

when $|\Delta COR[k-1]| \times 2 > \max der$      (ii)

$$fnclvl = COR[k] - \Delta COR[k]/4 \quad (6)$$

Subsequently, the perspective conflict determining process in S406 of FIG. 4, which is the characteristic portion of the present invention, will be described with reference to the flow chart illustrated in FIG. 11. More specifically, the perspective conflict is determined based on the defocus amounts and the reliabilities of at least the three ranging areas of the central ranging area and the peripheral ranging areas A and B respectively set in the ranging area setting process described with reference to the flow chart of FIG. 6. In the three ranging areas, the ranging area for which it is determined whether or not the perspective conflict occurs is the central ranging area which is interposed between the two peripheral ranging areas.

In S1101, the perspective conflict determination unit 213 determines whether or not the absolute value of the defocus amount of the central ranging area is equal to or lower than a threshold α. Then, the process is advanced to S1102 if the absolute value is equal to or lower than the threshold α, whereas the process is advanced to S1107 if the absolute value is not equal to or lower than the threshold α. Here, as the threshold α, the value indicating the state that the defocus amount is close to in-focusing is set.

If the absolute value of the defocus amount of the central ranging area is equal to or lower than the threshold α, it is determined in S1102 whether or not the respective defocus directions detected in the peripheral ranging areas A and B are opposite to each other. Then, the process is advanced to S1103 if the defocus directions are opposite to each other, whereas the process is advanced to S1107 if the defocus directions are the same. If it is determined in S1102 that the respective defocus directions (signs) of the peripheral ranging areas A and B are opposite to each other, then it is determined in S1103 whether or not the absolute values of the respective defocus amounts of the peripheral ranging areas A and B are equal to or higher than the absolute value of the defocus amount of the central ranging area. Then, the process is advanced to S1104 if these absolute values are equal to or higher than the absolute value of the defocus amount of the central ranging area, whereas the process is advanced to S1107 if these absolute values are not equal to or higher than the absolute value of the defocus amount of the central ranging area.

In S1104, it is determined whether or not the absolute values of the respective defocus amounts of the peripheral ranging areas A and B are equal to or lower than a threshold β. Then, the process is advanced to S1105 if the absolute values are equal to or lower than the threshold β, whereas the process is advanced to S1107 if the absolute values are not equal to or lower than the threshold β. Here, as the threshold β, the value which indicates the state that the defocus amount is close to in-focusing and is higher than the threshold α is set.

If it is determined in S1104 that the absolute values or the respective defocus amounts of the peripheral ranging areas A and B are equal to or lower than the threshold β, then it is determined in S1105 whether or not the reliabilities of the defocus amounts of the central ranging area and the peripheral ranging areas A and B are equal to or greater than a predetermined value. Then, the process is advanced to S1106 if the reliabilities are equal to or greater than the predetermined value, whereas the process is advanced to S1107 if the reliabilities are not equal to or greater than the predetermined value. As the threshold of the reliability set in S1105, it is desirable to set a value which is better than at least the value indicating "the defocus amount is in an untrustworthy state". Incidentally, the threshold to be used for determining the reliability is not limited to that exemplarily described in the present embodiment. Namely, it may be possible to adjust the threshold in consideration of various conditions including a control method, a photographing condition and the like. In S1106 to which the process is advanced if all the conditions in S1101 to S1105 are satisfied (i.e., YES in these steps), a perspective conflict occurrence flag of the central ranging area is set on, and then the perspective conflict determining process is ended. As just described, if all the conditions in S1101 to S1105 are satisfied (YES), it is determined that the perspective conflict occurs in the central ranging area.

The processes in S1101 to S1105 will be described in detail with reference to FIGS. 17A and 17B. FIGS. 17A and 17B are the diagrams exemplarily illustrating the arrangements of the central and peripheral ranging areas, and also showing the object condition by which the perspective conflict occurs in the central ranging area and thus false in-focusing is caused. More specifically, FIG. 17A shows that photographing is performed with the composition in which different-distance objects are being shifted laterally, and FIG. 17B snows that photographing is performed with the composition in which different-distance objects are being shifted longitudinally. In these drawings, the plurality of different-distance objects are included in the central ranging area. If the focus adjustment is performed with the defocus amount of the central ranging area, the intermediate distance between the distances of the objects 1 and 2 are in focus as shown in FIG. 15B, so that the false in-focusing is caused with out of focus for both the objects 1 and 2. In the object condition as in FIGS. 17A and 17B, if the focus adjustment is performed based on the defocus amount of the area which is other than the central ranging area, arranged on the periphery of the central ranging area, and unaffected by the perspective conflict, then the in-focusing is obtained with the focused object. For example, in the composition/ranging area arrangement shown in FIG. 17A, if it is determined that the perspective conflict occurs in the central ranging area and thus the focus adjustment is performed based on the defocus amount of the peripheral ranging area B, then the object 1 can be in focus. Further, in the composition/ranging area arrangement shown in FIG. 17B, if the focus adjustment is likewise performed based on the defocus amount of the peripheral ranging area B, then the object 1 can be in focus. To select the peripheral ranging areas A and B when it is determined that the perspective conflict occurs in the central ranging area, the defocus amounts of the respective peripheral ranging areas A and B are referred. Basically, the object positioned at the near side (close-range side) is preferentially used, and the peripheral ranging area in which the close-range direction is detected by the defocus amount is selected (peripheral ranging area B). Further, in the peripheral ranging areas A and B, the area in which the absolute value of the detected defocus amount is lower may be considered as being at the position closer to the in-focusing from the current focus position. Thus, it may be possible to control to select the relevant peripheral ranging area. Furthermore, since it is impossible to suppose whether the perspective conflict occurs laterally as in FIG. 17A or longitudinally as in FIG. 17B, it may be possible to arrange four peripheral ranging areas laterally and longitudinally by properly combing the arrangements of FIGS. 17A and 17B.

When the peripheral ranging area is used as described above, the following states are respectively decided in the perspective conflict determining process in S1101 to S1105:
(i) whether the value close to the in-focusing has been detected by the defocus amount of the central ranging area;
(ii) whether the detected defocus directions of the peripheral ranging areas A and B are opposite to each other;
(iii) whether the defocus amounts of the peripheral ranging areas A and B are larger than the defocus amount of the central ranging area;
(iv) whether the values close to the in-focusing have been detected by the defocus amounts of the peripheral ranging areas A and B; and
(v) whether the reliabilities of the central ranging area and the peripheral ranging areas A and B are high.

Hereinafter, the reason why the above states (i) to (v) should be decided will be described sequentially.

Decision of State (i)

The phase difference detection method is characterized in that accuracy of the defocus amount increases according as the state comes close to the in-focusing, and decreases according as the state goes away from the in-focusing (i.e., out of focus). Particularly, such a tendency is remarkable in the phase difference detection method to be used for the image pickup plane as described in the present embodiment. This because pupil intensity differences of the photodiodes A and B for the imaging pixels in the image pickup plane phase difference AF described in FIGS. 2A and 2B are different, and thus problems of a broken image and an asymmetric image occur according as the out-of-focus state. Since it is desirable to use a high-accuracy defocus amount for the determination as to whether or not the perspective conflict occurs, the determination is performed only in the state that the absolute value of the defocus amount is equal to or lower than the threshold α, that is, the state which is close to the in-focusing.

Decision of State (ii)

When the perspective conflict occurs in the central ranging area, the object is erroneously determined to be close to the in-focusing and thus the defocus amount of which the absolute value is small is detected. At this time, if the detected defocus directions of the peripheral ranging areas A and B arranged so as to overlap the central ranging area are opposite to each other, it is possible to determine that the perspective conflict might occur. Therefore, the decision of the state (ii) is included in the perspective conflict determination condition.

Decision of State (iii)

When the perspective conflict occurs in the central ranging area, the object is erroneously determined to be close to the in-focusing and thus the defocus amount of which the absolute value is small is detected. At this time, if the perspective conflict has occurred, the defocus amount of the peripheral ranging area arranged so as to overlap the central ranging area causes the out of focus, and thus the defocus amount of which the absolute value is larger than that of the central ranging area is detected. When there is such a tendency, there is a possibility that the different-distance object exists in or in the vicinity of the central ranging area. Therefore, the decision of the state (iii) is included in the perspective conflict determination condition. Besides, when the different-distance object does not exist in the ranging area, if the condition of the state (iii) is not considered, the detected defocus direction is dispersed because the defocus amount becomes small in the in-focusing. Therefore, there is a fear that the perspective conflict is carelessly determined. The condition of the state (iii) is meaningful also to prevent such a disadvantage.

Decision of State (iv)

When the absolute value of the defocus amount detected in the peripheral ranging area is too large, there is a possibility that an extremely remote object has been taken.

Also, there is a possibility that the object is photographed under the condition that the image shift amount cannot be correctly detected and thus defocus accuracy deteriorates. Therefore, to improve the accuracy of perspective conflict determination, the state that the object which is somewhat close to the in-focusing (not so out of focus) is taken in the peripheral ranging area is included in the perspective conflict determination condition.

Decision of State (v)

When the objects of which the defocus amount accuracy cannot be obtained have been taken in the central ranging area and the peripheral ranging areas A and B, there is a case where the conditions of the states (i) to (iv) are unexpectedly satisfied. To prevent such defectiveness, also the indicator of reliability is considered. More specifically, the case where the reliability of defocus amount such as the degree of conformity between two images, the steepness or the like has a reliable value in all of the central and peripheral ranging areas is included in the perspective conflict determination condition.

Figure 11:
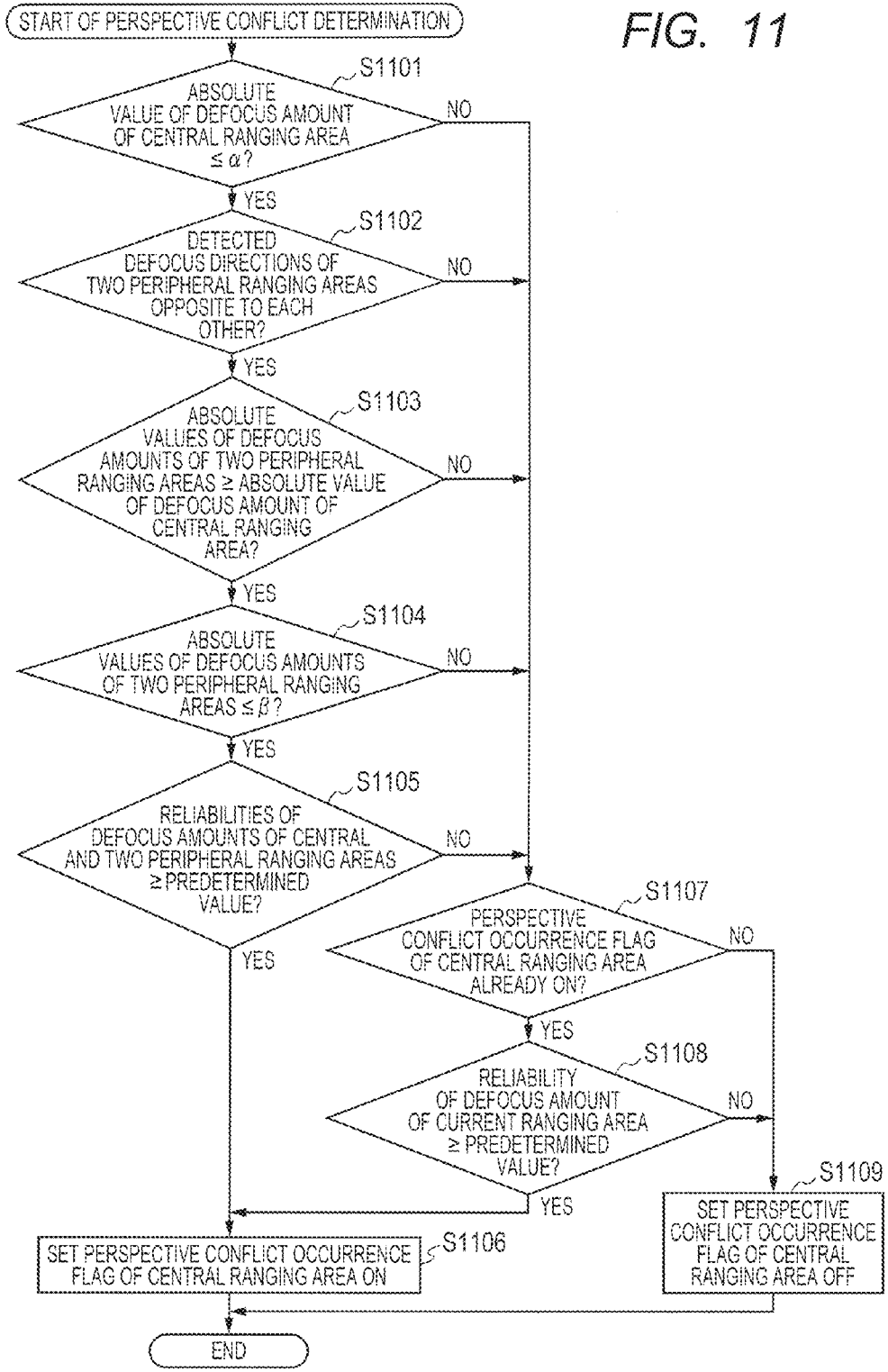
FIG. 11 is a flow chart indicating an operation of a perspective conflict determining process to be performed by the focus adjustment apparatus according to the first embodiment.

If the above states (i) to (v) are satisfied, that is, if all the conditions in S1101 to S1105 of FIG. 11 are satisfied (YES), there is a high possibility that the perspective conflict has occurred in the central ranging frame. Thus, the perspective conflict occurrence flag is set on in S1106. According to the perspective conflict occurrence flag, the ranging area to be used for the focus adjustment is selected in the ranging area selecting process in S407 of FIG. 4.

If the conditions in S1101 to S1105 are not satisfied (NO), then it is determined in S1107 whether or not the perspective conflict occurrence flag of the central ranging area has already been set on. Then, the process is advanced to S1108 if the flag has already been on, whereas the process is advanced to S1109 if the flag is off. In S1109, it is determined whether or not the reliability of the defocus amount of the ranging area currently used for the focus adjustment is equal to or greater than a predetermined value. Then, the process is advanced to S1106 if the reliability is equal to or greater than the predetermined value, whereas the process is advanced to S1109 if the reliability is not equal to or greater than the predetermined value. As the threshold of the reliability to be set at this time, it is desirable to set a value by which it is possible to determine whether or not at least the defocus direction can be detected. In S1109, the perspective conflict occurrence flag of the central ranging area is set off, and the perspective conflict determining process is ended.

Figure 4:
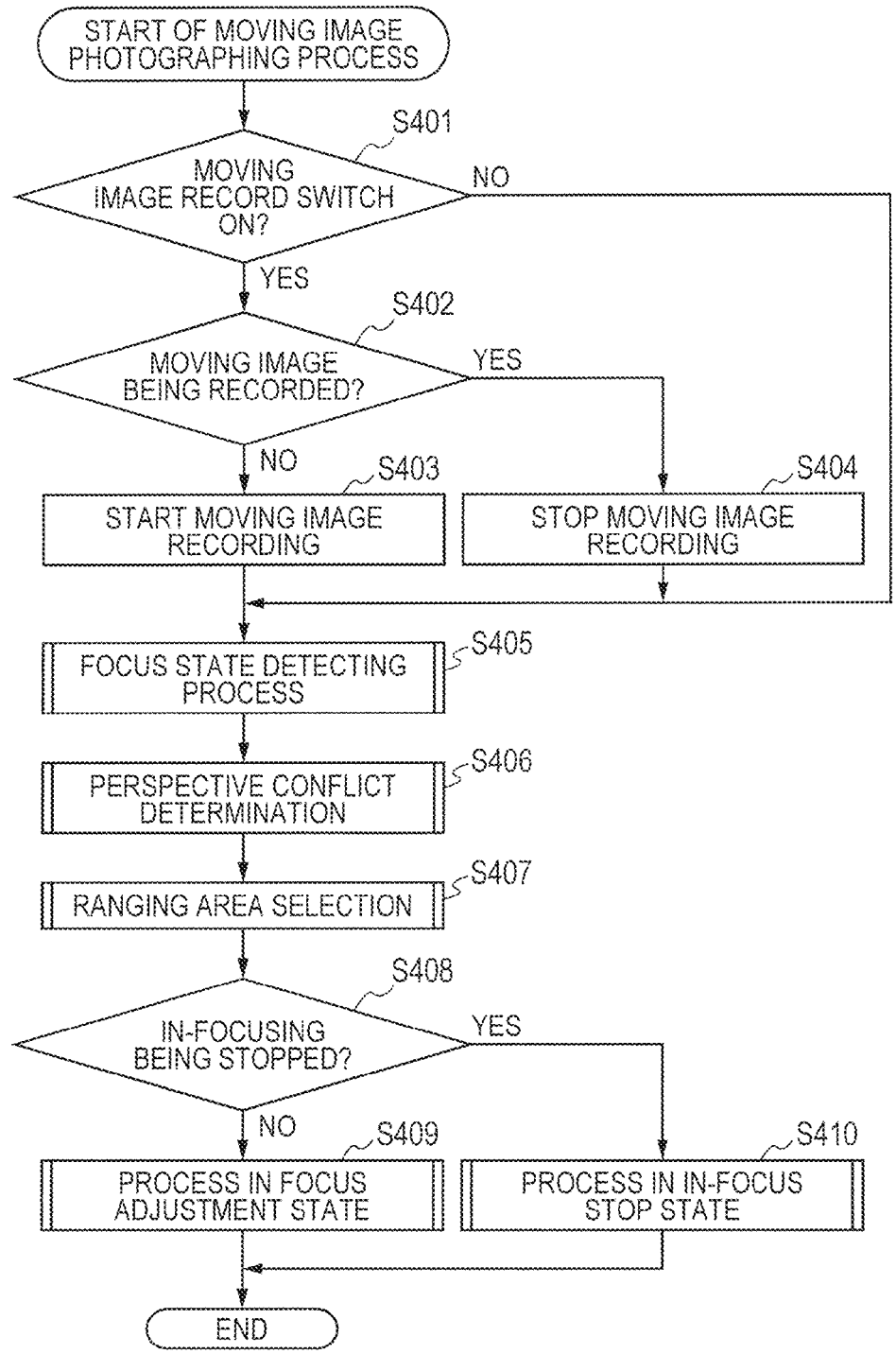
FIG. 4 is a flow chart indicating an operation of a moving image photographing process to be performed by the image pickup apparatus according to the first embodiment.

In the focus adjustment state, if the perspective conflict occurrence flag of the central ranging area is once set on in S1106, the ranging area selected in the ranging area selecting process in S407 of FIG. 4 is used without depending on the conditions in S1101 to S1105. For this reason, when the perspective conflict occurrence flag has already been set on in S1107, the process is advanced to S1106 without immediately setting the perspective conflict occurrence flag off in S1109. However, when the reliability of the defocus amount of the ranging frame used in the state that the perspective conflict occurrence flag is on is low, in particular, when the reliability is the level by which even the defocus direction cannot be detected, there is a possibility that the taken object has been moved or the object intended to be taken has been changed. When the reliability is enough to enable to detect the defocus direction, the state that the perspective conflict occurrence flag is on is continued in S1106. However, when the reliability is not enough to enable to detect the defocus direction, the perspective conflict occurrence flag is set off in S1109. Then, it is controlled to again use the central ranging frame for the focus adjustment in the ranging area selecting process in S407 of FIG. 4.

Subsequently, the ranging area selecting process in S407 of FIG. 4 will be described with reference to the flow chart illustrated in FIG. 12.

In S1201, the camera control unit 212 determines whether or not the perspective conflict flag of the central ranging area is off. Then, the process is advanced to S1202 if the flag is off, whereas the process is advanced to S1204 if the flag is on. As described above, the perspective conflict flag is set by the perspective conflict determining process in S406 of FIG. 4. In S1202 to which the process is advanced if the perspective conflict flag is off, the ranging area setting is performed so as to use the central ranging area, and the process is advanced to S1203. In S1203, the identification information (ID) of the ranging area is reset, and the ranging area selecting process is ended. That is, when the perspective conflict flag is off in S1201, the setting is performed so as to use the central ranging area. At this time, the ID of the ranging area is reset in S1203. The ID of the ranging area will be described later.

Next, when the perspective conflict flag is on in S1201, it is further determined in S1204 whether or not the ID of the ranging area has already been stored. Then, the process is advanced to S1205 if the ID is not stored, whereas the process is advanced to S1206 if the ID has been stored. In S1205 to which the process is advanced if the ID of the ranging area is not stored yet, the ID of, from the two peripheral ranging areas interposing the central ranging area therebetween, the near-side ranging area from which the defocus amount has been detected is stored, and the process is advanced to S1206. If the ID of the ranging area is stored in S1204 or S1205, then, in S1206, the peripheral ranging area corresponding to the stored ranging area ID is set to be used for the focus adjustment, and the ranging area selecting process is ended.

In S1204 to S1206, at the first time when the perspective conflict occurrence flag is set on, the ID of the peripheral ranging area is stored in S1205. After then, the ranging area set in S1205 is continuously used until the perspective conflict occurrence flag is set off. If the perspective conflict occurrence flag is again set on after the ID of the ranging area is reset in S1203 or S410 of FIG. 4, the ranging area is set anew in S1205. In the present embodiment, it is controlled in S1205 to select, in the two peripheral ranging areas, the near-side ranging area from which the defocus amount has been detected. However, the present invention is not limited to this method. For example, it may be controlled to select the ranging area in which the absolute value of the detected defocus amount is lower.

Subsequently, the process in the focus adjustment state (focusing state) in S403 of FIG. 4 will be described with reference to the flow chart illustrated in FIG. 13. Here, the process in the focus adjustment state is the process of driving the focus lens in the state that the in-focusing is not stopped and of determining the stop of the in-focusing.

In S1301, the camera control unit 212 determines whether or not the magnitude of the defocus amount is equal to or smaller than a predetermined amount (that is, the magnitude is in a depth of focus) and the reliability of the defocus amount is a value greater than a predetermined value. Then, the process is advanced to S1302 if these conditions are satisfied (YES), whereas the process is advanced to S1303 if these conditions are not satisfied (NO). In the present embodiment, the threshold to be used in S1301 is set to one time the depth of focus. However, it may be possible to increase or decrease the threshold if necessary. As the threshold of the reliability set in S1301, a value by which at least focusing accuracy can be assured is set.

In S1302, the camera control unit 212 is set to transition to the in-focus stop state, and the process in the focus adjustment state is ended. When it is determined that the object is in focus, the state that the focus lens 103 is driving is transitioned to the state that the driving is stopped, and then, in the in-focus stop state in S410 of FIG. 4, reactivation determination as to whether or not to again drive (reactivate) the focus lens 103 is performed.

If it is determined in S1301 that the defocus amount is not in the depth of focus or the reliability of the defocus amount is not greater than the predetermined value, then the camera control unit 212 performs in S1303 lens driving setting such as driving speed, a driving method of the focus lens 103, and the like, and the process is advanced to S1304. In S1304, the camera control unit 212 performs a lens driving process for the focus lens 103, and then the process in the focus adjustment state is ended.

In S1303, for example, driving parameters such as speed and the like are set for driving the lens. When the reliability of the defocus amount is high, the driving method of driving the lens based on the defocus amount is determined. On the other hand, when the reliability is low and thus the defocus amount is not reliable, the driving method of searching and driving the whole driving area of the focus lens 103 in disregard of the defocus amount is determined. Besides, although other settings necessary for the lens driving is performed in this step, the detailed description thereof will be omitted because it does not directly relate to the characteristic portion of the present invention. Also, the description of the lens driving process in S1304 will be omitted because it does not relate to the characteristic portion of the present invention.

Figure 14:
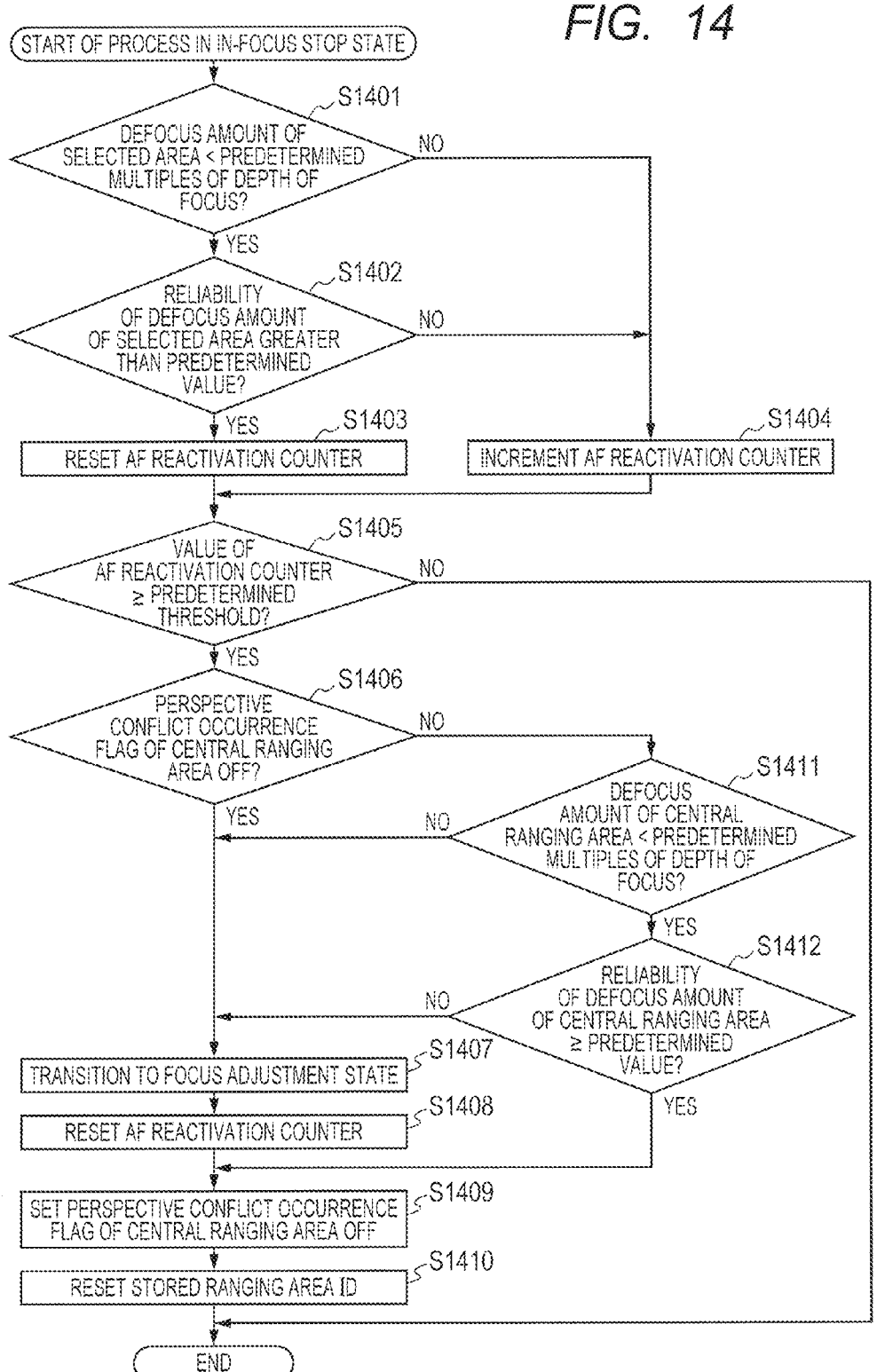
FIG. 14 is a flow chart indicating an operation of a process to be performed in an in-focus stop state by the focus adjustment apparatus according to the first embodiment.

Subsequently, the process in the in-focus stop state to be performed in S410 of FIG. 4 will be described with reference to the flow chart illustrated in FIG. 14. Here, the process in the in-focus stop state is the process of determining whether or not to again drive the focus lens 103 in the state that the in-focusing was once determined and thus the focus lens 103 is being stopped. In S1401, the camera control unit 212 determines whether or not the defocus amount calculated by the AF signal processing unit 204 is smaller than predetermined multiples (e.g., multiples larger than "1") of the depth of focus. Then, the process is advanced to S1402 if the calculated defocus amount is smaller than the predetermined multiples, whereas the process is advanced to S1404 if the calculated defocus amount is not smaller than the predetermined multiples. In S1402, the camera control unit 212 determines whether or not the reliability calculated by the AF signal processing unit 204 is greater than a predetermined value. Then, the process is advanced to S1403 if the calculated reliability is greater than the predetermined value, whereas the process is advanced to S1404 if the calculated reliability is not greater than the predetermined value. In S1403, the camera control unit 212 resets an AF reactivation counter, and then the process is advanced to S1405. In S1404, the camera control unit 212 counts up (increments) the AF reactivation counter, and then the process is advanced to S1405.

As described above, when the defocus amount is equal to or larger than the predetermined amount or the reliability of the defocus amount is not greater than the predetermined value, the camera control unit 212 determines that the main object being photographed has been changed, and thus prepares for the AF reactivation (i.e., re-driving of the focus lens 103). On the other hand, when it is determined that the main object is not changed because of the magnitude and the reliability of the defocus amount, the camera control unit 212 does not perform the AF reactivation (that is, the camera control unit maintains the stop state of the focus lens 103).

The threshold of the defocus amount in S1401 is experientially or experimentally set such that the AF reactivation is performed when the main object is changed whereas the AF reactivation is difficult to be performed when the main object is not changed. For example, "one time" of the depth of focus by which defocus (or blurring) of the main object becomes visible is set. Further, for example, the threshold of the reliability in S1402 is set such that, when the reliability is low to the extent that it is difficult to rely on the defocus direction, the main object is determined as having been changed and thus the AF reactivation is performed. As just described, the determinations to be performed in S1401 and S1402 can be considered as a determining process of determining whether or not the main object has been changed. Therefore, it is possible to replace these determinations by arbitrary processes by which the same determination can be achieved, and, in this case, kinds and values of the thresholds to be used are set according to processing.

In S1405, the camera control unit 212 determines whether or not the value of the AF reactivation counter is equal to or higher than a predetermined threshold. Then, the process is advanced to S1406 if the value is equal to or higher than the predetermined threshold, whereas the AF reactivation determining process is ended if the value is lower than the predetermined threshold. In S1406, the camera control unit 212 determines whether or not the perspective conflict occurrence flag of the central ranging area is off. Then, the process is advanced to S1407 if the flag is off, whereas the process is advanced to S1411 if the flag is on. In S1407, the camera control unit 212 performs setting to transition to the focus adjustment state, and the process is advanced to S1408. In S1408, the camera control unit 212 resets the AF reactivation counter, and the process is advanced to S1409.

When the reactivation is performed and the state is transitioned to the focus adjustment state an S1407, the camera control unit 212 determines whether or not the value of the AF reactivation counter incremented in S1404 is equal to or higher than the predetermined threshold. Here, it is desirable to set the threshold in the AF reactivation determination by determining whether or not the main object has been changed not based on the one-time determination of the magnitude and the reliability of the defocus amount but based on the statistic of the determination results obtained during a certain period of time. When the threshold for the AF reactivation determination becomes small, is becomes easily to sensitively follow up the object. However, there is a problem that negligent focusing is performed to an object to which a user wishes to tenaciously follow up by stopping the focus lens 103 (that is, it is supposed a case where another object cuts across in front of the main object). Therefore, the threshold in the AF reactivation determination is set in consideration of the above problem. Besides, the AF reactivation counter is reset in S1408 for when the state is again transitioned to the in-focus stop state.

After the resetting of the AF reactivation counter in S1408, the perspective conflict occurrence flag of the central ranging area is set off in S1409, and the process is advanced to S1410. In S1410, the camera control unit 212 resets the stored ranging area ID, and the process is ended.

If it is determined in S1406 that the perspective conflict occurrence flag of the central ranging area is on, it is further determined in S1411 whether or not the defocus amount of the central ranging area is smaller than predetermined multiples of the depth of focus. Then, the process is advanced to S1412 if the defocus amount is smaller than the predetermined multiples, whereas the process is advanced to S1407 if the document amount is not smaller than the predetermined multiples. In S1412, the camera control unit 212 determines whether or not the reliability of the defocus amount of the central ranging area is equal to or greater than a predetermined value. Then, the process is advanced to S1409 if the reliability is equal to or greater than the predetermined value, whereas the process is advanced to S1407 if the reliability is not equal to or greater than the predetermined value.

Figure 12:
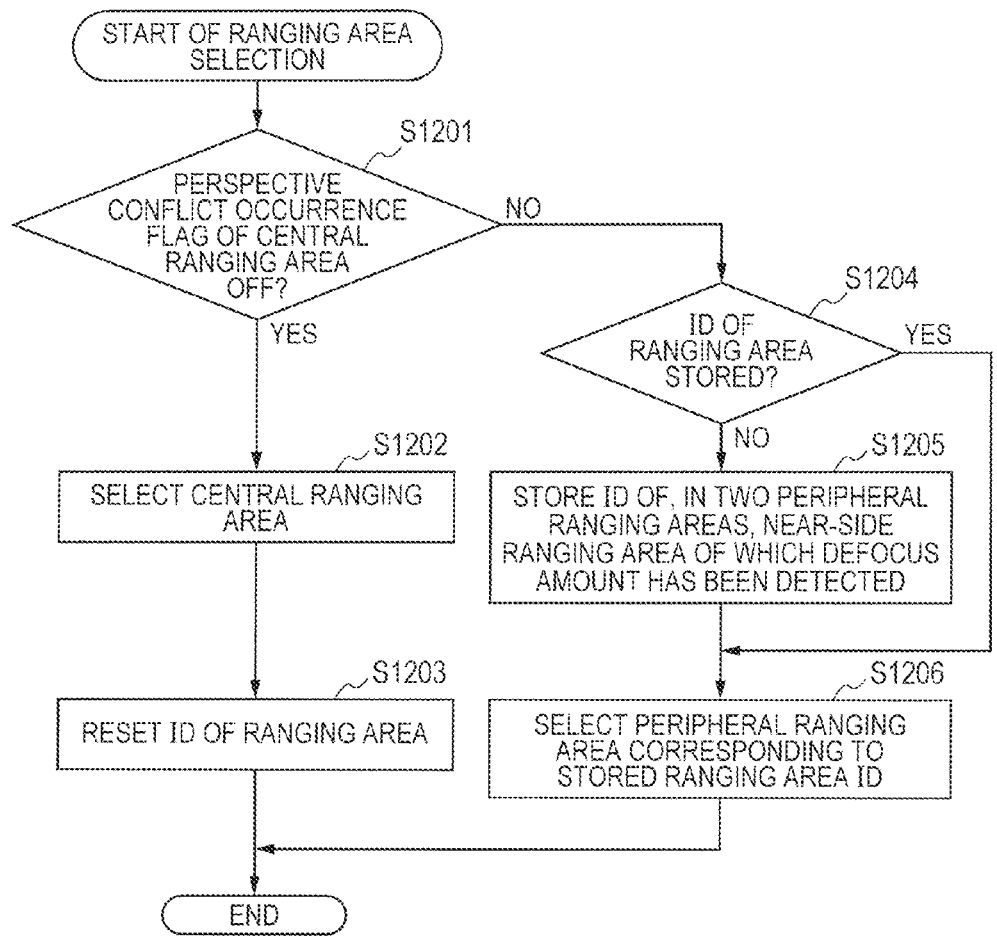
FIG. 12 is a flow chart indicating an operation of a ranging area selecting process to be performed by the focus adjustment apparatus according to the first embodiment.
Figure 13:
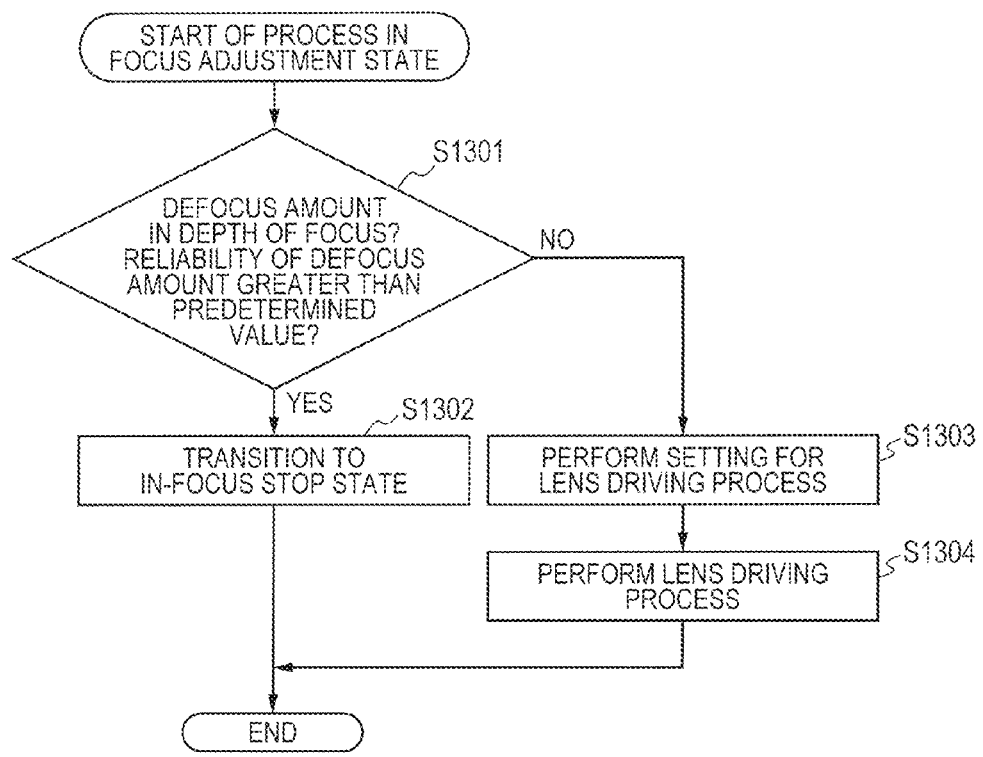
FIG. 13 is a flow chart indicating an operation of a process to be performed in a focus adjustment state by the focus adjustment apparatus according to the first embodiment.

When the perspective conflict occurrence flag of the central ranging area is set on in S1106 of FIG. 11 and the state is transitioned to the in-focus stop state in S1302 of FIG. 13, the determinations in S1401 and S1402 are controlled to be performed in the peripheral ranging area set in S1205 of FIG. 12. If it is determined in S1405 that the value of the AF reactivation counter is equal to or higher than the predetermined threshold, then it is determined in S1406 whether or not the reactivation determination is performed using the peripheral ranging area. If the peripheral ranging area is used, then it is controlled to further perform the determinations in S1411 and S1412. In S1411 and S1412, the determinations same as those performed to the peripheral ranging area in S1401 and S1402 are performed to the central ranging area. Even when it is determined in S1405 that the main object of the peripheral ranging area has been changed, there is a possibility that the main object has been moved to the position in the central ranging area (that is, there is a possibility that the composition has been corrected or changed). If it is determined in S1411 and S1412 that the object is within the predetermined multiples of the depth of focus of the central ranging area and the reliability is great, the transition setting to the focus adjustment state is not performed in S1407 and S1408, and it is set to select the central ranging area in S1409 and S1410. Then, the process in the in-focus stop state is once ended. Subsequently, the process in the in-focus stop state is continuously performed using the defocus amount and the reliability of the central ranging area. Thus, in the case where the reactivation determination is performed in the peripheral ranging area, even if the main object moves to the vicinity of the central ranging area or a photographer adjusts the composition such that the main object comes into the central ranging area, it is possible to improve stability of AF while suppressing negligent focusing. Incidentally, although the process is advanced to S1409 if it is determined in S1411 and S1412 that the main object is in focus in the central ranging area, it may be possible to control to advance the process to S1408 to reset the AF reactivation counter. When it is controlled to also perform the process in S1408, since counting by the AF reactivation counter is again performed, it is possible to further suppress negligent focusing. However, in this case, when the main object has greatly been changed, there is a possibility that the transitioning to the focus adjustment state is delayed.

As described above, in the image pickup apparatus according to the present embodiment, at least the two peripheral ranging areas are provided on the periphery of the central ranging area so as to partially overlap the central ranging area, and the focus adjustment is normally performed based on the defocus amount and the reliability of the central ranging area. Then, when it is determined that the perspective conflict occurs in the central ranging area based on the defocus amounts and the reliabilities of the central and peripheral ranging areas, the focus adjustment is performed based on the defocus amounts and the reliabilities of the peripheral ranging areas. Consequently, even when the perspective conflict occurs in the central ranging area and thus the main object is falsely in focus with out of focus, it is possible to bring the main object into focus and thus obtain the in-focusing. Therefore, it is possible to achieve the focusing suitable for the perspective-conflict object.

Moreover, according to the present embodiment, in the case where the perspective conflict occurs, since it is unnecessary to again detect the focus state by again setting the ranging area, then it is possible to quickly and smoothly obtain the in-focusing of the main object. Moreover, since the ranging areas are arranged longitudinally, it is possible to improve the problem even when the perspective conflict occurs in the longitudinal direction.

Incidentally, the scope of the present invention is not limited to the ranging area arrangement exemplarily described in the present embodiment. Particularly, in the image pickup plane phase difference detection method described in FIGS. 2A and 2B, a degree of freedom as to ranging area arrangements is high. Moreover, it may be possible to control to set all the central ranging area, and the lateral- and longitudinal-direction peripheral ranging areas by properly combining the arrangements of FIGS. 17A and 17B. Moreover, in addition to the peripheral ranging areas described in FIG. 17A, for example, it may be possible to further set a peripheral ranging area C at the position obtained by shifting rightward the center of visual field from the peripheral ranging area B, and thus determine the perspective conflict state of the peripheral ranging area B based on the defocus amounts of the central ranging area and the peripheral ranging area C. Moreover, it may be possible to arrange the peripheral ranging area not only in the lateral- and longitudinal-directions but also in an oblique or another direction.

Second Embodiment

Hereinafter, the second embodiment of the present invention will be described. First, the differences between the present embodiment and the first embodiment will be described.

In the first embodiment, in addition to the central ranging area, at least the two peripheral ranging areas are provided so as to partially overlap the central ranging area, and the focus adjustment is normally performed based on the defocus amount and the reliability of the central ranging area. It is determined whether or not the perspective conflict occurs in the central ranging area based on the defocus amounts and the reliabilities of the central and peripheral ranging areas. Then, if it is determined that the perspective conflict occurs, the focus adjustment is performed based on the defocus amounts and the reliabilities of the peripheral ranging areas.

In the second embodiment, when a photographing mode indicated by photographing mode information set in the camera control unit 212 of the camera main body 20 in FIG. 1 is a still image mode, it is controlled to divide and arrange the peripheral ranging area such that the divided ranging areas are within the central ranging area. On other hand, if the photographing mode is a moving image mode, it is not controlled to arrange the peripheral ranging area to be within the central ranging area, but it is controlled to arrange the peripheral ranging areas in, for example, the manner same as described in the first embodiment.

Since the constitution of the interchangeable lens camera consisting of the lens and the camera main body in the present embodiment is the same as that described with reference to FIG. 1 in the first embodiment, the description thereof will be omitted. Moreover, the processes in the present embodiment are the same as those in the first embodiment except for the ranging area setting process in S304 of FIG. 3 and S501 of FIG. 5. Therefore, only the still image photographing process and the ranging area setting process respectively characteristic in the present embodiment will be described hereinafter.

Figure 18:
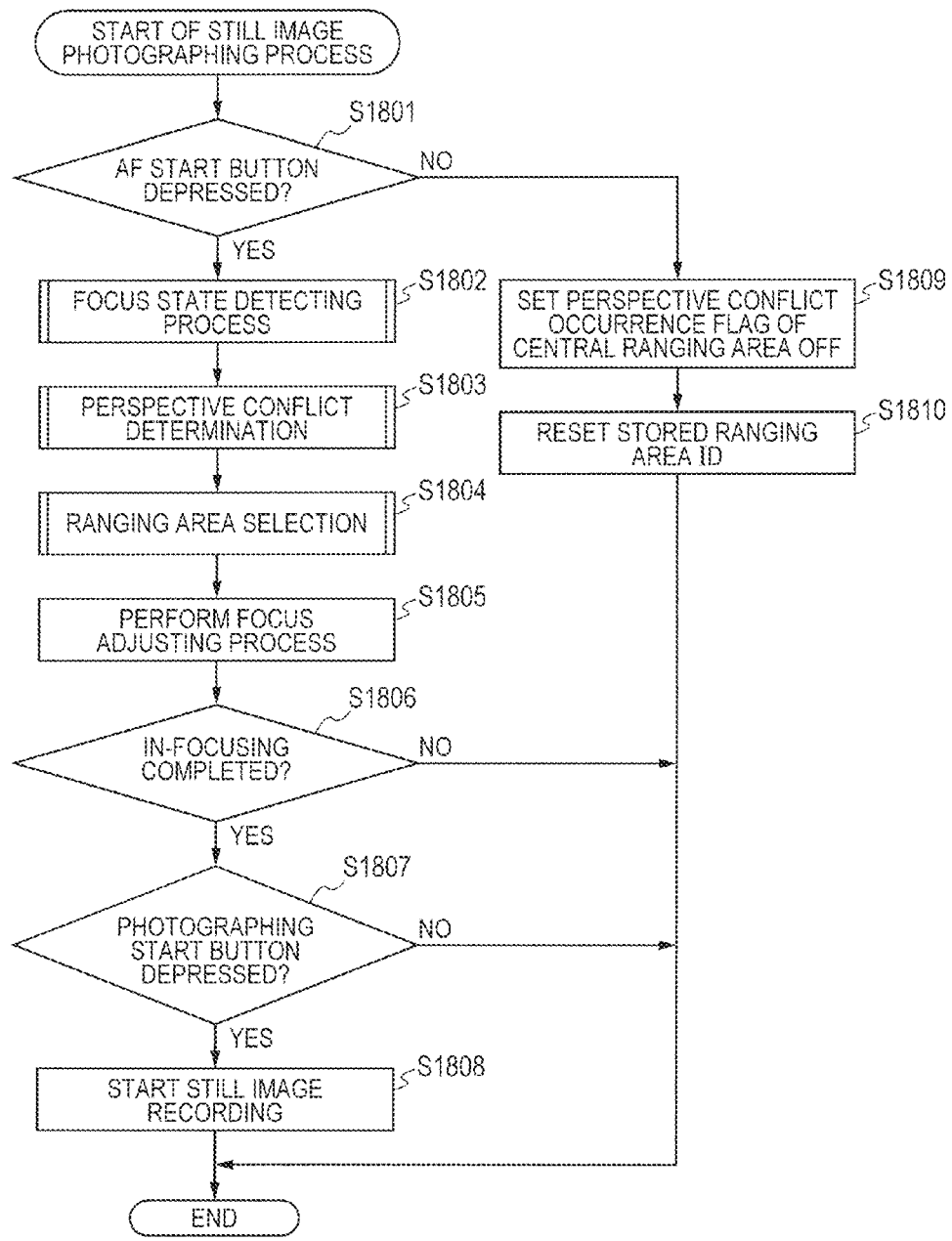
FIG. 18 is a flow chart indicating an operation of a still image photographing process to be performed by an image pickup apparatus according to a second embodiment of the present invention.

The still image photographing process in S304 of FIG. 3 will be described with reference to a flow chart illustrated in FIG. 18. In S1801, the camera control unit 212 determines whether or not the AF start button is depressed via the camera operation unit 214. Then, the process is advanced to S1802 if the AF start button is depressed, whereas the process is advanced to S1809 if the AF start button is not depressed. In S1809 to which the process is advanced if the AF start button is not depressed, the perspective conflict occurrence flag of the central ranging area is set off, and the process is further advanced to S1810. In S1810, the stored ranging area ID is reset, and the still image photographing process is ended. Here, since the processes in S1809 and S1810 are the same as those in S1202 and S1203 of FIG. 12 and those in S1409 and S1410 of FIG. 14 in the first embodiment, the detailed descriptions thereof will be omitted. When the AF start button is not depressed in the still image photographing, the state that any perspective conflication is not determined is reset.

Then, if it is determined in S1801 that the AF start button is depressed, the focus state detecting process is performed in S1802, and the process is advanced to S1803. Since the focus state detecting process in S1802 is the same as that already described with reference to the flow chars of FIG. 5 in the first embodiment, the detailed description thereof will be omitted. On the other hand, since the ranging area setting process in S501 of FIG. 5 is the characteristic portion of the present invention, the detail thereof will be described later.

Next, after the focus state detecting process in S1802, the perspective conflict determination unit 213 determines in S1803 whether or not the perspective conflict occurs in the central ranging area, and the process is advanced to S1804. Here, since the perspective conflict determining process in S1803 is the same as that already described with reference to the flow chart of FIG. 11 in the first embodiment, the detailed description thereof will be omitted.

Next, after the perspective conflict determination process in S1803, the camera control unit 212 selects an S1804 the ranging area to be used, based on the result of the perspective conflict determination process in S1803. Then, the process is advanced to S1805. Here, since the ranging area selecting process in S1804 is the same as that already described with reference to the flow chart of FIG. 12 in the first embodiment, the detailed description thereof will be omitted.

Next, after selecting the ranging area in S1804, the camera control unit 212 performs in S1805 the focus adjusting process using the selected ranging area, and the process is advanced so S1806. In S1805, the focus adjusting process is performed by driving the focus lens 103 based on the defocus amount and the reliability of the ranging area detected and set in S1802 to S1804. Here, the detailed description of the focus adjusting process will be omitted. In S1806, the camera control unit 212 determines whether or not the in-focusing is completed. Then, the process is advanced to S1807 if the in-focusing is completed, whereas the still image photographing process is ended if the in-focusing is not completed. In S1807, the camera control unit 212 determines whether or not the photographing start button is depressed via the camera operation unit 214. Then, the process is advanced to S1808 if the photographing start button is depressed, whereas the still image photographing process is ended if the photographing start button is not depressed. In S1808, the camera control unit 212 starts still image recording to the recording medium 203 via the recording medium control unit 207, and then the still image photographing process is ended. In the present embodiment, it is possible to start the photographing by depressing the photographing start button in S1807 only after it was determined in S1806 that the in-focusing was completed. Incidentally, the present invention is not limited to the constitution described in the present embodiment. For example, it may be possible to have a constitution of starting the still image photographing when the photographing start button is depressed even before the in-focusing is completed. Incidentally, after it was determined in S1806 that the in-focusing was completed, if the still image photographing process is again started without depression of the photographing start button in S1807, the focus state is detected in S1802. In this case, it may be possible to drive the focus lens 103 in the focus adjusting process of S1805 or not. Further, it may be possible to have a constitution of not performing the processes in S1802 to S1805 after it was determined in S1806 that the in-focusing was completed.

Figure 19:
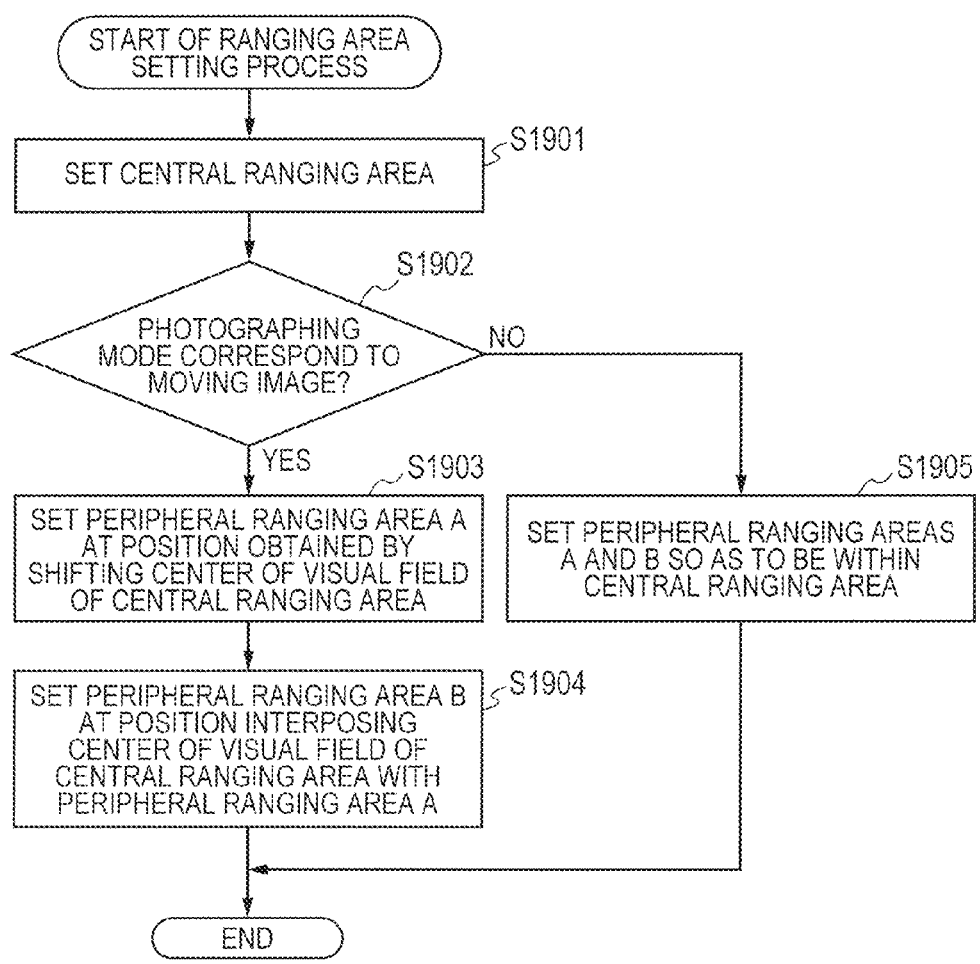
FIG. 19 is a flow chart indicating an operation of a ranging area setting process to be performed by a focus adjustment apparatus according to the second embodiment.

Next, in the process of S1802, the ranging area setting process in S501 of FIG. 5 will be described with reference to a flow chart illustrated in FIG. 19. Here, since the processes in S1901, S1903 and S1904 of FIG. 19 are respectively the same as those in S601, S602 and S603 of FIG. 6 described in the first embodiment, the descriptions thereof will be omitted. The central ranging area is set in S1901, and it is then determined in S1902 whether or not the photographing mode corresponds to a moving image. Then, the process is advanced to S1903 if the photographing mode corresponds to the moving image, whereas the process is advanced to S1905 if photographing mode corresponds to a still image. In S1905, the peripheral ranging areas A and B are respectively set such that these areas are within the central ranging area set in S1901, and the ranging area setting process is ended. For example, the peripheral ranging areas are set and arranged in such a manner as illustrated in each of FIGS. 20A and 20B.

In the second embodiment, unlike the first embodiment, the peripheral ranging area is set such that the center of visual field thereof is shifted from the central ranging area, and, in addition, at least the two peripheral ranging areas are set so as to be within the central ranging area. In any case, the method of setting the ranging area is different from that in the first embodiment, but the method of determining the perspective conflict and the method of selecting the ranging frame to be used when the perspective conflict occurs are the same as those in the first embodiment.

Since images are continuously and repeatedly picked up in the moving image photographing, the photographing itself is easily influenced by a change of the position of the object to be taken due to various factors such as a composition change, an object movement, a camera shaking and the like. For this reason, in the first embodiment, when the moving image is photographed, the peripheral ranging areas are set so as to be shifted from the central ranging area respectively as illustrated in FIGS. 17A and 17B, so that it is possible to take more peripheral objects.

Figure 20A:
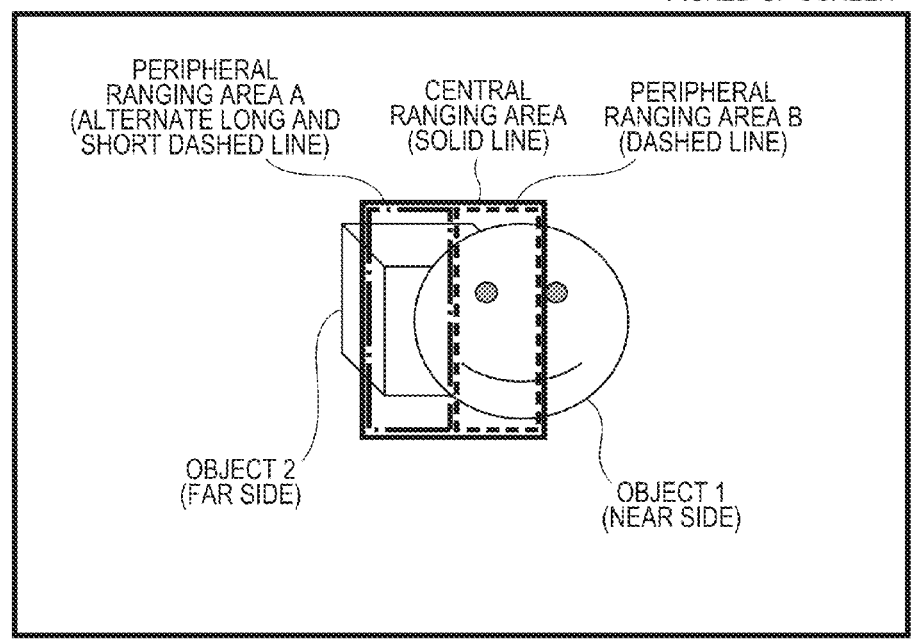
FIGS. 20A and 20B are diagrams illustrating examples of arrangements of central and peripheral ranging areas set by the focus adjustment apparatus according to the second embodiment and examples of perspective-conflict objects.
Figure 20B:
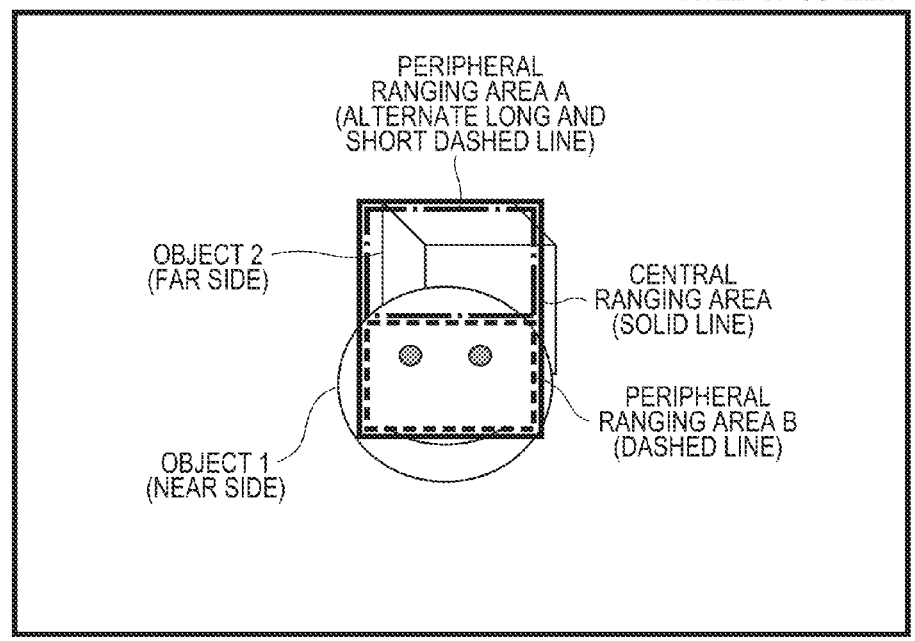

When the still image is photographed, in general, since the user often depresses the AF start button to start the AF operation in the state that he/she has decided the composition, there is a high possibility that the main object exists within the central ranging area. For this reason, if the peripheral ranging area has been highly shifted from the central ranging area, there is a possibility that an object other than the main object that the user intends to photograph is taken. Therefore, when the still image is photographed, the peripheral ranging areas are set to be within the central ranging area as illustrated in FIGS. 20A and 20B. By arranging the ranging areas like this, it is possible to detect the perspective conflict only in the central ranging area and thus perform the focus adjustment for the main object without out of focus.

As described above, in the image pickup apparatus according to the present embodiment, when the photographing mode is the still image mode, the peripheral ranging area is arranged so as to be within the central ranging area, and then it is determined based on the defocus amounts and the reliabilities of the central and peripheral ranging areas whether or not the perspective conflict occurs in the central ranging area. Then, if it is determined that the perspective conflict occurs, the focus adjustment is performed based on the defocus amount and the reliability of the peripheral ranging area. Thus, when there is a high possibility that photographing is performed with a fixed composition as in the still image photographing, it is possible to perform the perspective conflict extermination to the limited area, i.e., the central ranging area.

Incidentally, the scope of the present invention is not limited to the ranging area arrangements exemplarily described in the present embodiment. For example, although the two peripheral ranging areas are arranged in the present embodiment, it may be possible to three or more peripheral ranging areas.

Besides, it may be possible to unify the methods of arranging the ranging areas in the still image photographing and the moving image photographing into either one of the method described in the first embodiment and the method described in the second embodiment.

Third Embodiment

Hereinafter, the third embodiment of the present invention will be described. First, the differences between the present embodiment and the second embodiment will be described.

In the second embodiment, according to the photographing mode information set in the camera control unit 212 of the camera main body 20 illustrated in FIG. 1, it is controlled when the photographing mode is the still image mode to divide and arrange the peripheral ranging area so as to be within the central ranging area.

Figure 21:
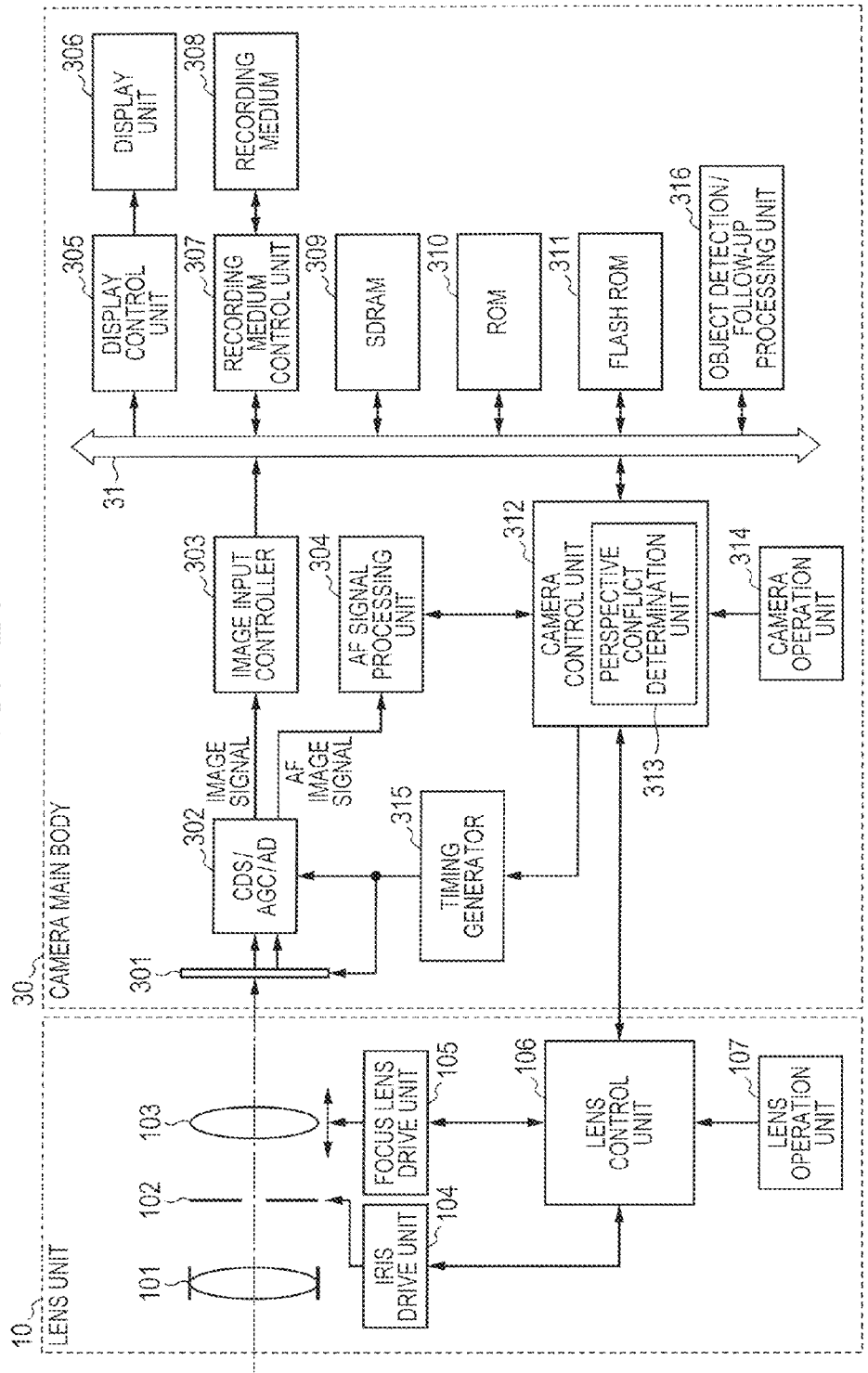
FIG. 21 is a block diagram exemplarily illustrating a functional constitution of an interchangeable lens camera which is an example of an image pickup apparatus to which a focus adjustment apparatus according to a third embodiment of the present invention is applied.

In the third embodiment, as illustrated in later-described FIG. 21, a means for detecting/following up an object is provided in the camera main body, and it is controlled to divide and arrange the peripheral ranging area to be within the central ranging area on condition that the object is being detected/followed up.

The constitution of the interchangeable lens camera consisting of the lens unit, and the camera main body will be described with reference to FIG. 21. Namely, the image pickup apparatus according to the present embodiment is constituted by an exchangeable lens unit 10 and a camera main body 30. Here, since the lens unit 10 is the same as the lens unit 10 illustrated in FIG. 1, the detailed description thereof will be omitted. Moreover, since the constitutions of functional blocks 301 to 315 in the camera main body 30 are the same as those of the functional blocks 201 to 215 in the camera main body 20 of FIG. 1, the detailed descriptions thereof will be omitted. An object detection/follow-up processing unit 316 in FIG. 21 detects a specific object based on an image signal input from the image input controller 303, and transfers the position of the specific object in the picked-up image to the camera control unit 312. The image signals are continuously input from the image input controller 303. Then, when the detected specific object is moved, the position to which the detected specific object was moved is determined, and the determined position is notified to the camera control unit 312, so that it is possible to follow up the position of the specific object. For example, the specific object is a face object, an object which exists at the position designated on the picked-up screen by the user via the camera operation unit 314, or the like.

Figure 5:
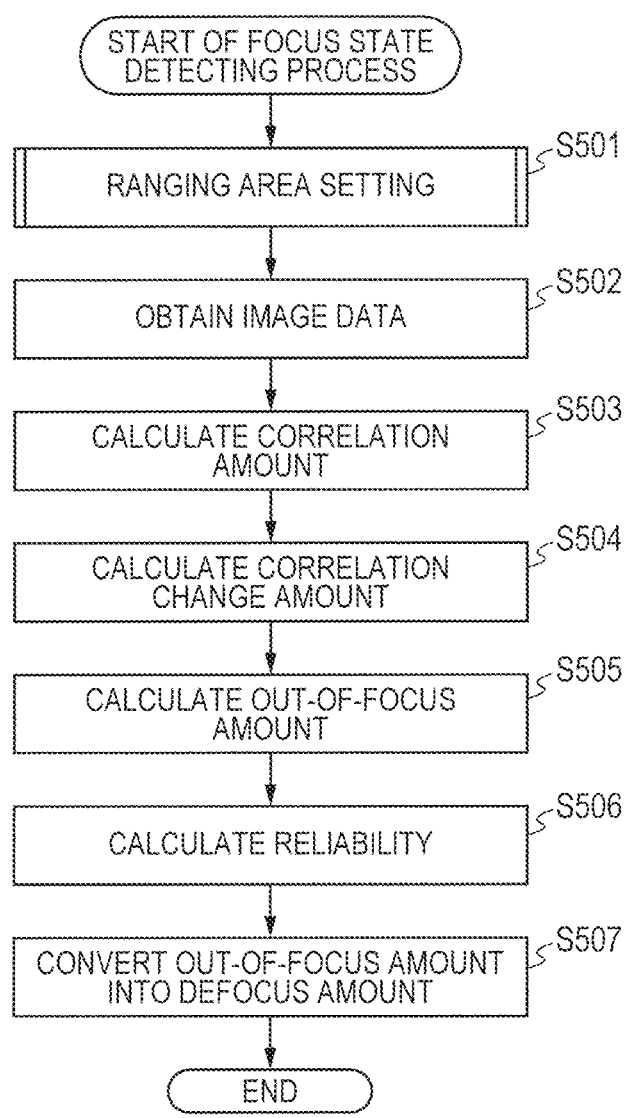
FIG. 5 is a flow chart indicating an operation of a focus state detecting process to be performed by a focus adjustment apparatus according to the first embodiment.
Figure 6:
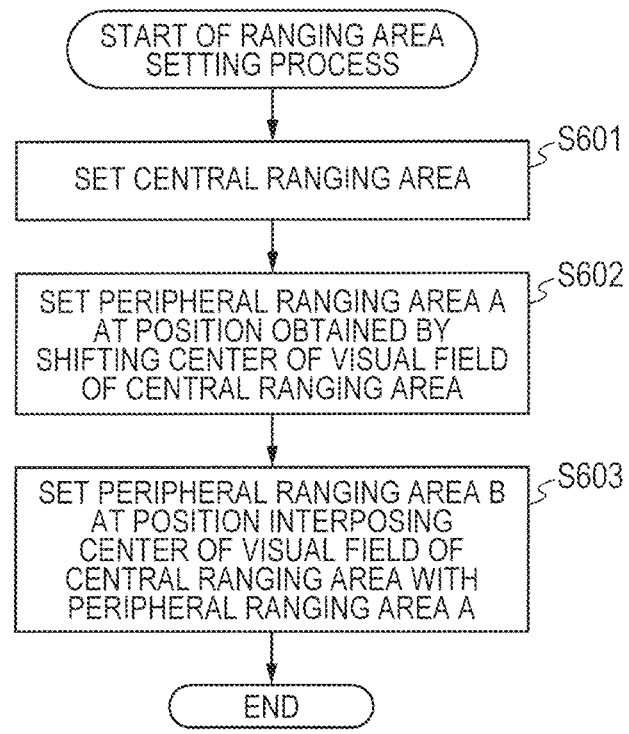
FIG. 6 is a flow chart indicating an operation of a ranging area setting process to be performed by the focus adjustment apparatus according to the first embodiment.

In the present embodiment, since the processes except for the ranging area setting process in S501 of FIG. 5 are the same as those described in the second embodiment, only the ranging area setting process which is characteristic in the present embodiment will be described hereinafter.

Figure 22:
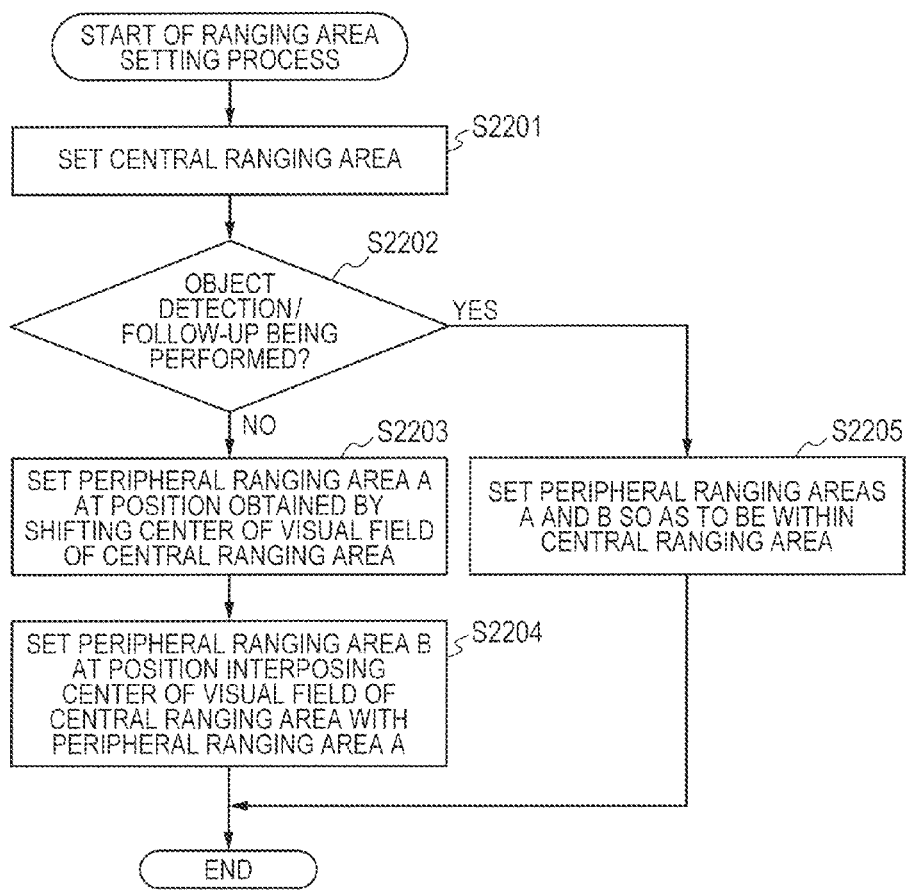
FIG. 22 is a flow chart indicating an operation of a ranging area setting process to be performed by the focus adjustment apparatus according to the third embodiment.

The ranging area setting process in S501 of FIG. 5 will be described with reference to a flow chart illustrated in FIG. 22. Here, since the processes in S2201, S2203, S2204 and S2205 of FIG. 22 are respectively the same as those in S1901, S1903, S1904 and S1905 of FIG. 19 described in the second embodiment, the detailed descriptions thereof will be omitted.

After the central ranging area was set in S2201, it is determined in S2202 whether or not the object detection/follow-up processing unit 316 is performing object detection/follow-up. Then, the process is advanced to S2203 if the object detection/follow-up is not being performed, whereas the process is advanced to S2205 if the object detection/follow-up is being performed. When the object detection/follow-up is being performed, in S2205, the peripheral ranging area is set so as to be within the central ranging area. On the other hand, when the object detection/follow-up is not performed, in S2203 and S2204, the peripheral ranging area is set at the position shifted from the central ranging area.

For example, when the face object is detected, it is anticipated that the background and an object having the object distance different from that of the face object exist on the periphery of the face object. If the peripheral ranging area is set so as not to be within the central ranging area when the face object is detected, the perspective conflict occurs in the peripheral ranging area. In such a case, if the peripheral ranging area in which the perspective conflict occurs is used, there is a fear that the focus adjustment is contrarily performed to the object which is not the face object. Therefore, when the object detection/follow-up is being performed, the peripheral ranging area is set so as to be within the central ranging area.

As described above, in the image pickup apparatus according to the present embodiment, when the object detection/follow-up is being performed, the peripheral ranging area is arranged so as to be within the central ranging area, and it is determined based on the defocus amounts and the reliabilities of the central and peripheral ranging areas whether or not the perspective conflict occurs in the central ranging area. If it is determined that the perspective conflict occurs, the focus adjustment is performed based on the defocus amount and the reliability of the peripheral ranging area. Thus, when there is a possibility that the perspective conflict occurs in the peripheral ranging area as in case of following up the object, it is possible to perform the perspective conflict determination to the limited area, i.e., the central ranging area.

Fourth Embodiment

Hereinafter, the fourth embodiment of the present invention will be described. First, the differences between the present embodiment and the first embodiment will be described.

In the first embodiment, the central ranging area and the two peripheral ranging areas are set, the occurrence of the perspective conflict in the central ranging area is determined based on the defocus amounts and the reliabilities of the set areas, and, if the occurrence of the perspective conflict is determined, the focus adjustment is performed based on the defocus amounts and the reliabilities of the peripheral ranging areas used in the determination.

In the fourth embodiment, the occurrence of the perspective conflict in the central ranging area is determined based on the central ranging area and at least the four peripheral ranging areas. If the occurrence of the perspective conflict is determined, the focus adjustment is performed in the peripheral ranging areas. However, in the present embodiment, the focus adjustment is performed based on the defocus amount and the reliability of a set peripheral ranging area other than at least the above four peripheral ranging areas, in accordance with the result of the perspective conflict determination. In other words, the focus adjustment is performed using the peripheral ranging area which is not used in the perspective conflict determination.

Since the constitution of the interchangeable lens camera consisting of the lens unit and the camera main body are the same as that described with reference to FIG. 1 in the first embodiment, the description thereof will be omitted.

Figure 23:
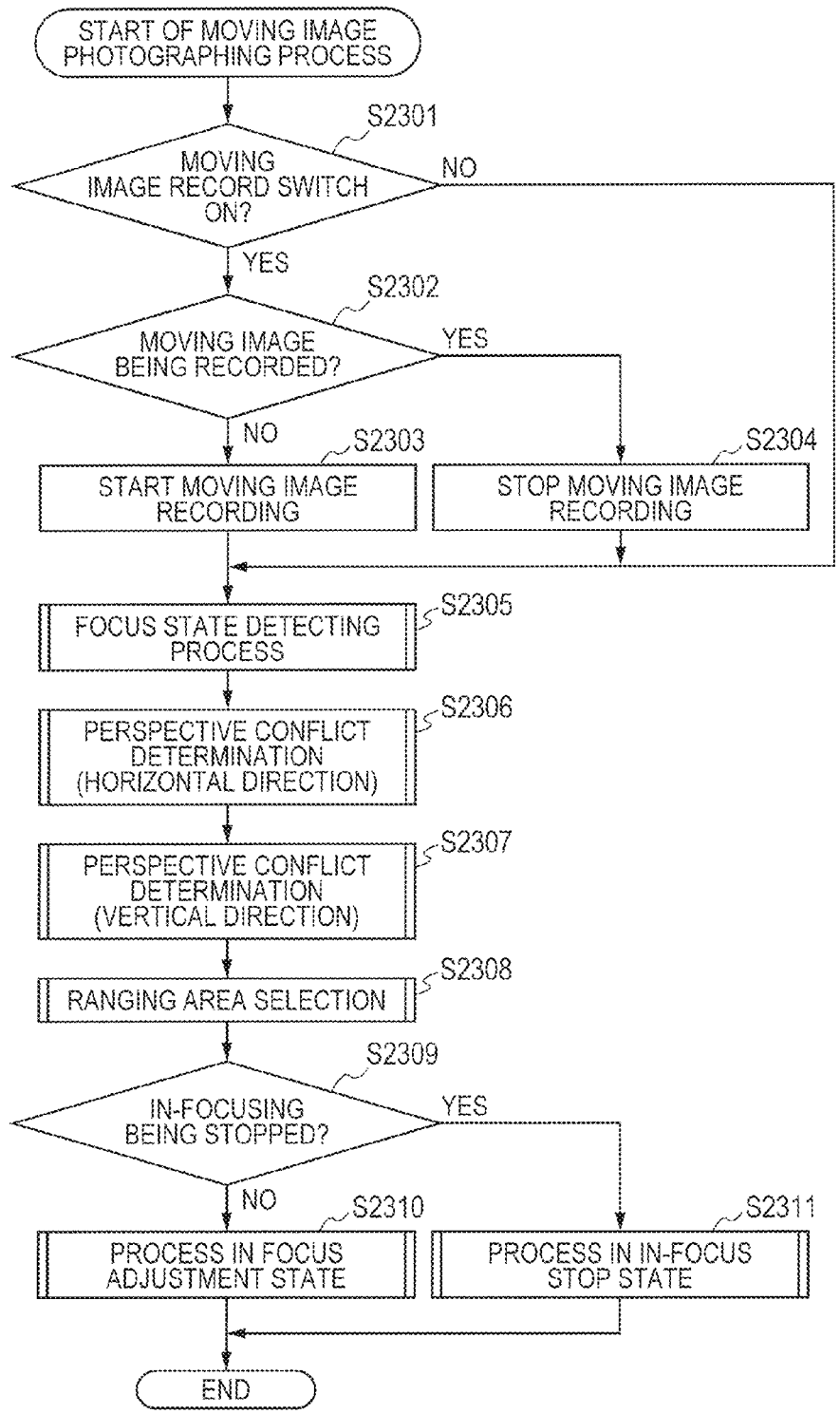
FIG. 23 is a flow chart indicating an operation of a moving image photographing process to be performed by an image pickup apparatus according to a fourth embodiment.

Besides, in the present embodiment, the processes other than the moving image photographing process in S303 of FIG. 3, the ranging area setting process in S501 of FIG. 5 and a ranging area selecting process in later-described S2308 of FIG. 23 are the same as those described in the first embodiment. Hereinafter, only the moving image photographing process, the ranging area setting process and the ranging area selecting process which are characteristic in the present embodiment will be described.

First, the moving image photographing process in S303 of FIG. 3 will be described with reference to the flow chart illustrated in FIG. 23.

Since the processes in S2301 to S2305 and S2309 to S2311 of FIG. 23 are respectively the same as the processes in S401 to S405 and S408 to S410 of FIG. 4, the detailed descriptions thereof will be omitted. However, in the focus state detecting process in S2305, since the ranging area setting process in S501 of FIG. 5 is the characteristic portion of the present invention, this process will later be described in detail.

After the focus state detecting process was performed in S2305, the perspective conflict determination unit 213 determines in S2306 whether or not the perspective conflict occurs, by using the central ranging area and the horizontally arranged peripheral ranging area, and the process is advanced to S2307. In S2307, the perspective conflict determination unit 213 determines whether or not the perspective conflict occurs, by using the central ranging area and the vertically arranged peripheral ranging area, and the process is advanced to S2308. As described above, in the present embodiment, the peripheral ranging areas are arranged at least in the two directions, i.e., horizontal and vertical directions, in regard to the central ranging area, and the perspective conflict determination is performed to the respective directions. The method of arranging the ranging areas and the method of selecting the ranging area to be used when the perspective conflict occurs will be described later. After the vertical-direction perspective conflict determination in S2307, the camera control unit 212 performs in S2308 the ranging area selecting process, and the process is advanced to S2309. Here, since the ranging area selecting process in S2308 is the characteristic portion of the present invention, the detail of this process will be described later with reference to a flow chart illustrated in FIG. 25.

Figure 24:
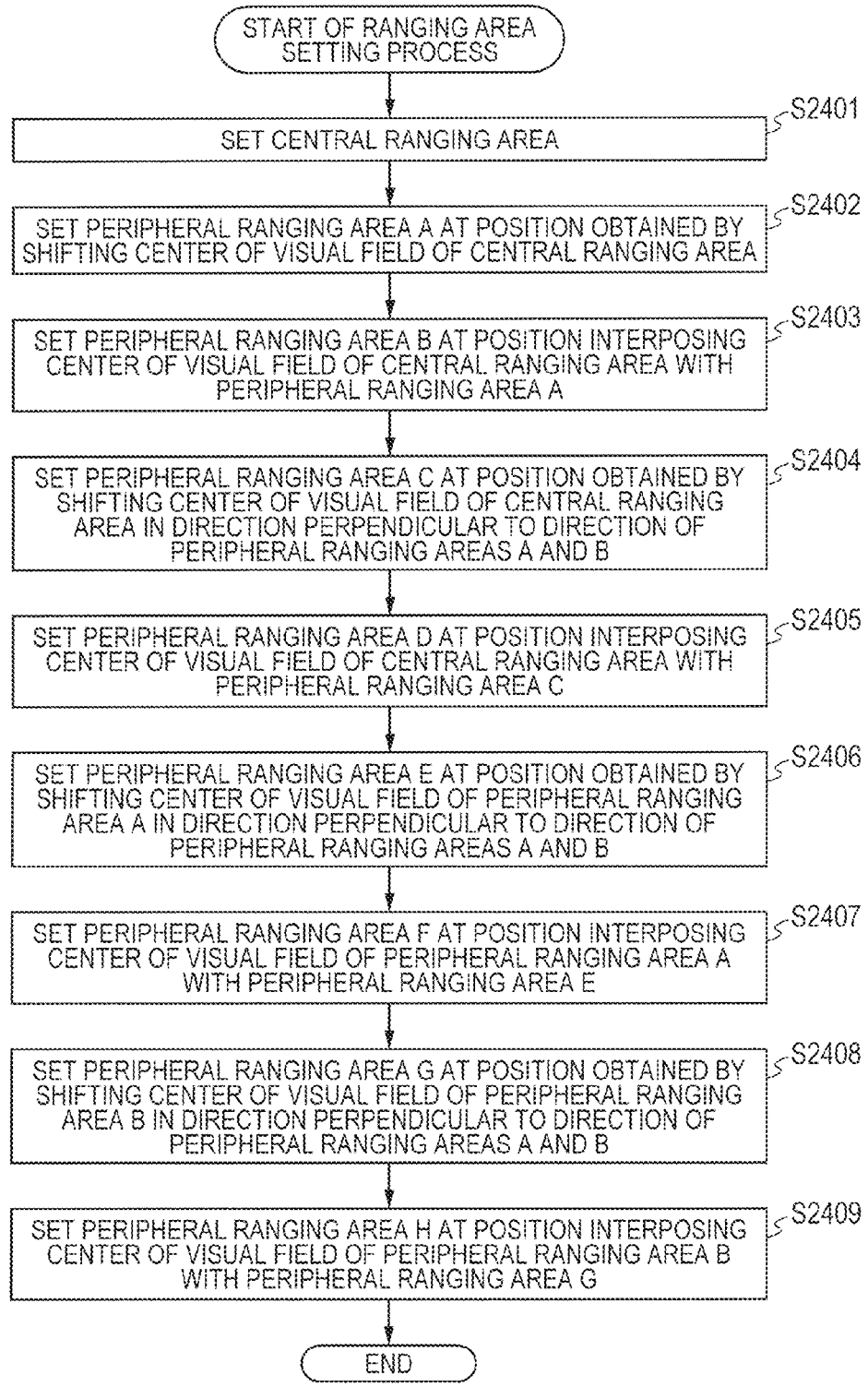
FIG. 24 is a flow chart indicating an operation of a ranging area setting process to be performed by a focus adjustment apparatus according to the fourth embodiment.

Subsequently, the ranging area setting process in S501 of FIG. 5 will be described with reference to a flow chart illustrated in FIG. 24. Since the processes in S2401 to S2403 of FIG. 24 are respectively the same as the processes in S601 to S603 of FIG. 6 described in the first embodiment, the descriptions thereof will be omitted. In S2404 to be performed after the peripheral ranging area B was set in S2403, the peripheral ranging area C is set in the direction perpendicular to the straight line connecting the peripheral ranging areas A and B and at the position shifted from the center of visual field of the central ranging area, and the process is advanced to S2405. In S2405, the peripheral ranging area D is set at the position interposing the center of visual field of the central ranging area with the peripheral ranging area C, and the process is advanced to S2406. In S2406, the peripheral ranging area E is set in the direction perpendicular to the straight line connecting the peripheral ranging areas A and B and at the position shifted from the center of visual field of the peripheral ranging area A, and the process is advanced to S2407. In S2407, the peripheral ranging area F is set at the position interposing the center of visual field of the peripheral ranging area A with the peripheral ranging area E, and the process is advanced to S2403. In S2408, the peripheral ranging area G is set in the direction perpendicular to the straight line connecting the peripheral ranging areas A and B and at the position shifted from the center of visual field of the peripheral ranging area B, and the process is advanced to S2409. In S2409, the peripheral ranging area H is set at the position interposing the center of visual field of the peripheral ranging area B with the peripheral ranging area G, and then the ranging area setting process is ended.

Figure 25:
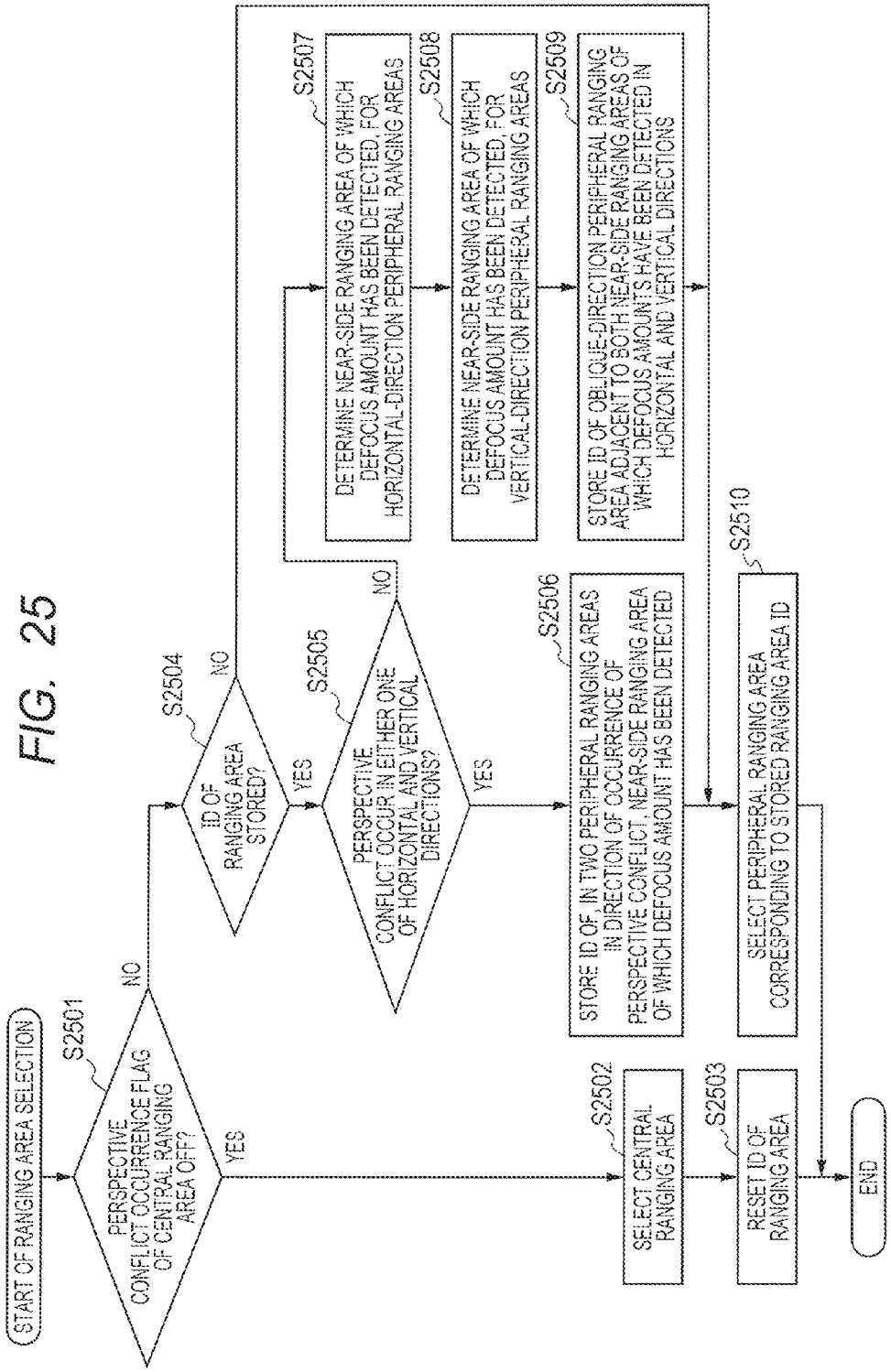
FIG. 25 is a flow chart indicating an operation of a ranging area selecting process to be performed by the focus adjustment apparatus according to the fourth embodiment.
Figure 26:
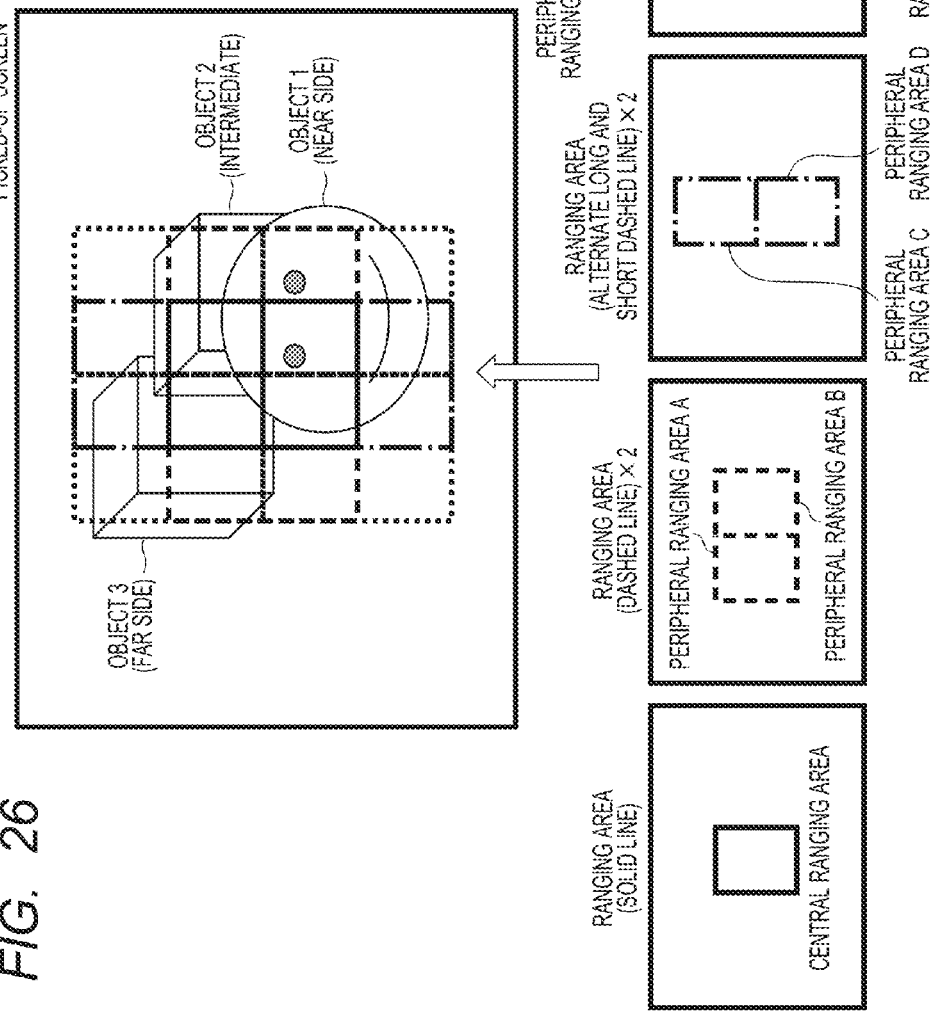
FIG. 26 is a diagram illustrating an example of an arrangement of central and peripheral ranging areas set by the focus adjustment apparatus according to the fourth embodiment and an example of perspective-conflict objects.

FIG. 26 illustrates examples of the ranging areas set in the ranging area setting process of FIG. 24. More specifically, the central ranging area, the two horizontal-direction peripheral ranging areas, the two vertical-direction peripheral ranging areas, and the four oblique-direction peripheral ranging areas are set respectively. The reason why the ranging areas are arranged like this is to detect the perspective conflicts not only in the horizontal- and vertical-directions but also in the oblique direction when the perspective conflict occurs obliquely due to, e.g., mixture of plural objects as illustrated in FIG. 26, thereby obtaining in-focusing to the oblique-direction main object. In any case, the method of selecting the peripheral ranging area when the perspective conflict occurs will be described later with reference to the flow chart illustrated in FIG. 25.

Next, the ranging area selecting process in S2308 of FIG. 23 will be described with reference to the flow chart illustrated in FIG. 25. Since the processes in S2501 to S2504 and S2510 or FIG. 25 are respectively the same at the processes in S1201 to S1204 and S1206 of FIG. 12 described in the first embodiment, the detailed descriptions thereof will be omitted.

In S2501 and S2504, if it is determined that the perspective conflict occurs in the central ranging area and it is not yet determined in which peripheral ranging area the focus adjustment should be performed, then it is determined its S2505 whether or not the perspective conflict occurs in either one of the horizontal and vertical directions. Then, the process is advanced to S2506 if it is determined that the perspective conflict occurs in either one of the horizontal and vertical directions, whereas the process is advanced to S2507 if the perspective conflicts occur in both the horizontal and vertical directions. When the perspective conflict occurs only in one of the horizontal and vertical directions, in S2506, in the peripheral ranging areas in the direction in which the perspective conflict occurs, the near-side ranging area of which the defocus amount has been detected is set as the ranging area to be sued for the focus adjustment, end the ID thereof is stored. Then, the process is advanced to S2510. As just described, in the present embodiment, when it is determined that the perspective conflict occurs only in one of the horizontal and vertical directions, as well as the first embodiment, in the peripheral ranging areas in which the perspective conflicts have been determined, the near-side ranging area of which the defocus amount has been detected is used for the focus adjustment.

On the other hand, if it is determined in S2505 that the perspective conflicts occur in both the horizontal and vertical directions, it is controlled to perform the focus adjustment using the peripheral ranging area other than the peripheral ranging area in which the determination of the perspective conflict has been performed. When it is determined in S2505 that the perspective conflicts occur in both the horizontal and vertical directions, the camera control unit 212 determines in S2507 the near-side ranging area of which the defocus amount has been detected, for the horizontal-direction peripheral ranging areas. Then, the process is advanced to S2508. In S2508, the camera control unit 212 determines the near-side ranging area of which the defocus amount has been detected, for the vertical-direction peripheral ranging areas. Then, the process is advanced to S2509. In S2509, the camera control unit 212 selects the oblique-direction peripheral ranging area arranged adjacent to both the near-side ranging areas of which the defocus amounts have been detected respectively in the horizontal- and vertical-direction peripheral ranging areas determined in S2507 and S2508. Then, the ID of the selected oblique-direction peripheral ranging area is stored so as to perform the focus adjustment using this ranging area, and the process is advanced to S2510.

The example of the processes in S2507 to S2509 will be described with reference to FIG. 26. Initially, it is assumed that the perspective conflict occurs horizontally, and thus the near-side peripheral ranging area B of which the defocus amount has been detected is selected. Next, it is assumed that the perspective conflict occurs vertically, and thus the near-side peripheral ranging area D of which the defocus amount has been detected is selected. Finally, the oblique-direction peripheral ranging area H which is adjacent to both the peripheral ranging areas B and D is determined as the ranging area for which the focus adjustment is performed.

Thus, when the perspective conflicts occur in both the horizontal and vertical directions, there is a case where the perspective conflict occurs in the oblique direction. In such a case, by selecting the peripheral ranging area positioned in the oblique direction in regard to, in the horizontal- and vertical-direction peripheral ranging areas, the near-side ranging areas of which the defocus amounts have been detected, it is possible to obtain in-focusing to the main object even when the oblique-direction perspective conflict occurs.

As described above, in the image pickup apparatus according to the present embodiment, the determinations of the perspective conflicts are performed in both the horizontal and vertical directions. Then, when the perspective conflicts occur in both the horizontal and vertical directions, the near-side peripheral ranging area of which the defocus amount has been detected is determined in each of the horizontal and vertical direct lens. Subsequently, the oblique-direction peripheral ranging area which is adjacent to the horizontal- and vertical-direction near-side peripheral ranging areas of which the defocus amounts have been detected is determined as the ranging area for which the focus adjustment is performed. Thus, it is possible to obtain in-focusing so the main object even when the perspective conflict occurs obliquely.

Incidentally, in the present embodiment, the perspective conflict determinations are performed in the two directions, i.e., horizontal and vertical directions, and it is then controlled to use the ranging area in the third direction according to the information obtained as a result of the determinations. However, it may be possible to essentially perform the perspective conflict determinations in the three directions, i.e., horizontal, vertical and oblique directions, respectively.

Fifth Embodiment

Hereinafter, the fifth embodiment of the present invention will be described. First, the differences between the present embodiment and the first embodiment will be described.

In the first embodiment, the perspective conflict determination is performed on the basis of the central ranging area. That is, the occurrence of the perspective conflict is determined based on whether or not the absolute value of the defocus amount of the central ranging area is equal to or lower than the predetermined value, whether or not the detected defocus directions of the two peripheral ranging areas are opposite to each other, and whether or not the absolute value of the defocus amount of the peripheral ranging area is larger than that of the defocus amount of the central ranging area.

On the other hand, in the fifth embodiment, the occurrence of the perspective conflict is determined on the basis of either one of the two peripheral ranging areas. Here, it is assumed that the peripheral ranging area to be used this time is a peripheral ranging area X and the other peripheral ranging area is a peripheral ranging area Y. Then, the occurrence of the perspective conflict is determined based on whether or not the absolute value of the defocus amount of the peripheral ranging area X is equal to or lower than a predetermined value, whether or not the detected defocus directions of the central ranging area and the peripheral ranging area Y are the same, and whether or not the absolute value of the defocus amount of the central ranging area is higher than the absolute value of the defocus amount of the peripheral ranging area X and the absolute value of the defocus amount of the peripheral ranging area Y is higher than the absolute value of the defocus amount of the central ranging area.

Since the constitution of the interchangeable lens camera consisting of the lens unit and the camera main body are the same as that described with reference to FIG. 1 in the first embodiment, the description thereof will be omitted. Moreover, in the present embodiment, the processes other than the perspective conflict determining process in S406 of FIG. 4 are the same as those described in the first embodiment. Therefore, only the perspective conflict determining process which is characteristic in the present embodiment will be described hereinafter.

Figure 27:
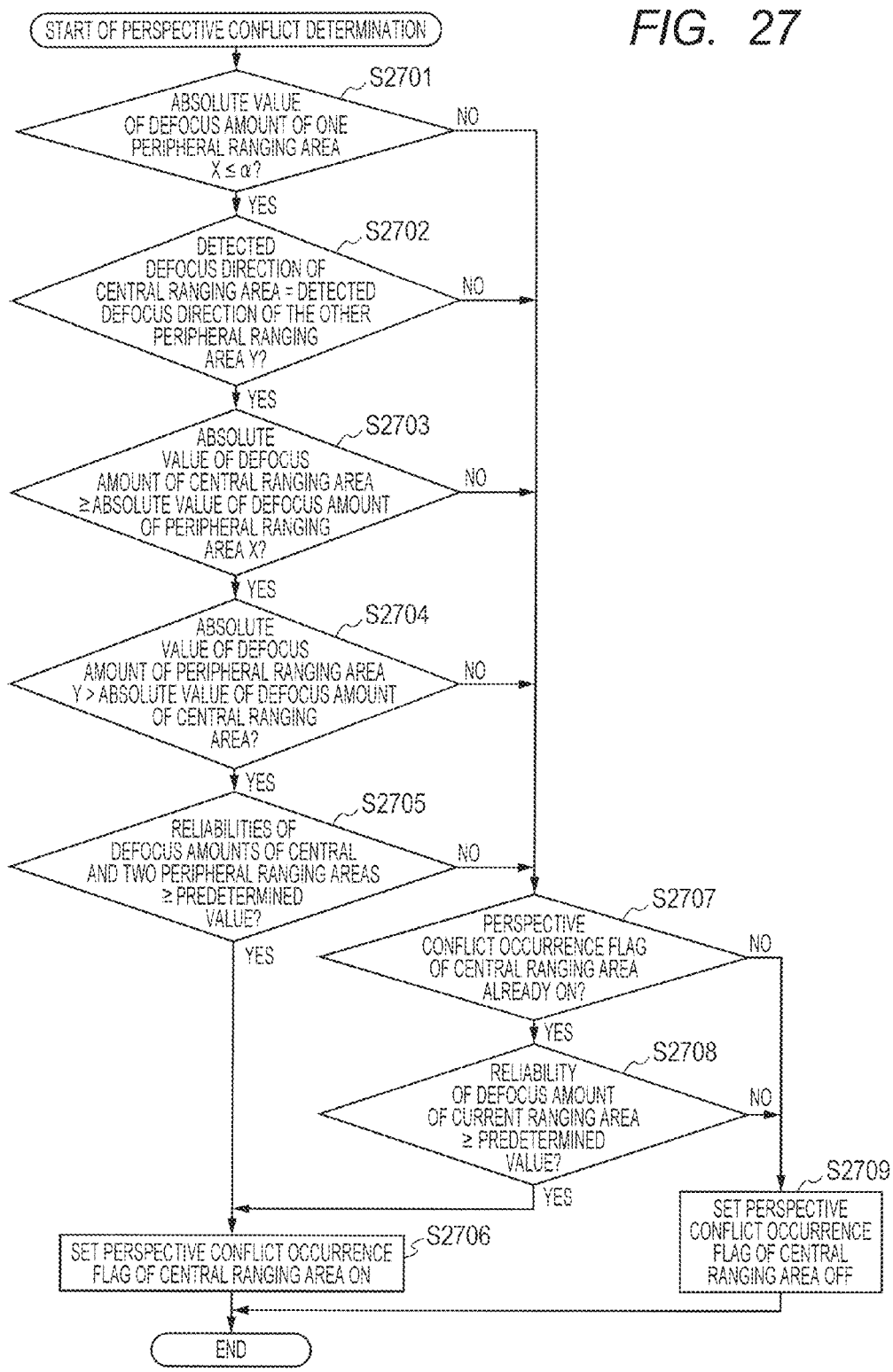
FIG. 27 is a flow chart indicating an operation of a perspective conflict determining process to be performed by a focus adjustment apparatus according to a fifth embodiment of the present invention.

The perspective conflict determining process in S406 of FIG. 4 will be described with reference to a flow chart illustrated in FIG. 27. Here, since the processes in S2706 to S2709 of FIG. 27 are respectively the same as the processes in S1106 to S1109 of FIG. 11 described in the first embodiment, the detailed descriptions thereof will be omitted.

When the perspective conflict determining process is started, the perspective conflict determination unit 213 determines in S2701 whether or not the absolute value of the defocus amount of either one of the two peripheral ranging areas is equal to or lower than a predetermined value α. Then, the process is advanced to S2702 if the absolute value is equal to or lower than the predetermined value α, whereas the process is advanced to S2707 if the absolute value is not equal to or lower than the predetermined value α. The peripheral ranging area for which it is determined in S2701 that the absolute value of the defocus amount is equal to or lower than the predetermined value α is set as the peripheral ranging area X, and the other peripheral ranging area is set as the peripheral ranging area Y. Here, it is assumed that the peripheral ranging area B in FIG. 17A is used as the peripheral ranging area X in the flow chart of FIG. 27 and the peripheral ranging area A in FIG. 17A is used as the peripheral ranging area Y in the flow chart of FIG. 27. In S2702, it is determined whether or not the detected defocus amounts of the central ranging area and the peripheral ranging area Y are in the same direction. Then, the process is advanced to S2703 if these amounts are in the same direction, whereas the process is advanced to S2707 if these amounts are in the opposite directions respectively. In S2703, it is determined whether or not the absolute value of the defocus amount of the central ranging area is equal to or higher than the absolute value of the defocus amount of the peripheral ranging area X. Then, the process is advanced to S2704 if the absolute value is equal to or higher than the absolute value of the defocus amount of the peripheral ranging area X, whereas the process is advanced to S2705 if the absolute value is not equal to or higher than the absolute value of the defocus amount of the peripheral ranging area X. In S2704, it is determined whether or not the absolute value of the defocus amount of the peripheral ranging area Y is higher than the absolute value of the defocus amount of the central ranging area. Then, the process is advanced to S2705 if the absolute value is higher than the absolute value of the defocus amount of the central ranging area, whereas the process is advanced to S2707 if the absolute value is not higher than the absolute value of the defocus amount of the central ranging area. In S2705, it is determined whether or not the reliabilities of the defocus amounts of the central ranging area and the two peripheral ranging areas X and Y are equal to or greater than a predetermined value. Then, the process is advanced to S2706 if the reliabilities are equal to or greater than the predetermined value, whereas the process is advanced to S2707 if the reliabilities are not equal to or greater than the predetermined value.

When YES is given in each of all the processes in S2701 to S2705, the perspective conflict occurrence flag of the central ranging area is set on in S2706. On the other hand, if YES is not given in any one of these processes, it is determined in S2707 whether or not the perspective conflict has already occurred and it is further determined in S2708 whether or not the reliability deteriorates, and then the perspective occurrence flag is set on or off.

In the first embodiment, the determination as to whether or not the detected defocus directions of the peripheral ranging areas are opposite to each other on the basis of the central ranging area is used as one of the conditions of the perspective conflict determination. This is the condition by which it is possible to determine the occurrence of the perspective conflict from the state that the false in-focusing has been caused at the intermediate position between the near-side and far-side objects due to the perspective conflict as illustrated in FIG. 15B. However, if the focus adjustment is performed from, e.g., the near side of the object 1 of FIG. 15B, the perspective conflict determination is performed after the operation once passed through the in-focus position of the object 1, and then the focus adjustment operation returns to the in-focus position of the object 1. Thus, for example, when the focus adjustment is performed in the moving image photographing, the above focus adjustment operation is undesirable because the operation of once passing through the object is recorded as the unnatural operation. Moreover, the focus adjustment time until the in-focusing is completed is prolonged irrespective of whether the moving image or not.

Therefore, in the present embodiment, by performing the perspective conflict determination not based on the central ranging area but based on either one of the peripheral ranging areas, it is possible to improve the above focus adjustment operation which once passed through the object and then returns to obtain the in-focusing. When the focus adjustment is performed based on the peripheral ranging area B of FIG. 17A, it is first determined whether or not the absolute value of the defocus amount of the peripheral ranging area B is close to the in-focusing. Subsequently, it is determined whether or not the detected defocus directions of the central ranging area and the peripheral ranging area A are the same, it is further determined whether or not the absolute value of the defocus amount of the central ranging area is higher than the absolute value of the defocus amount of the peripheral ranging area B, and it is further determined whether or not the absolute value of the defocus amount of the peripheral ranging area A is higher than the absolute value of the defocus amount of the central ranging area. Thus, in case of performing the focus adjustment from the nearer side than the object 1, it is possible, even if not driving the focus lens 103 to the position between the objects 1 and 2 as in FIG. 15E, to determine whether or not the perspective conflict occurs. Thus, it is possible to obtain the in-focusing for the object 1 without passing through the object 1.

In case of performing the focus adjustment from the farther side than the object 2, this focus adjustment is performed based on the peripheral ranging area A. Also in this case, it is likewise possible to perform the perspective conflict determination of the central ranging area. However, in this case, the area to be selected as the peripheral ranging area used in the ranging area selecting process of FIG. 12 is not the peripheral ranging area A based on which the focus adjustment was performed but is the peripheral ranging area B in which the nearer-side defocus amount was detected. Thus, even when performing the focus adjustment from the farther side than the object 2, it is possible to smoothly obtain the in-focusing for the object 1.

Incidentally, since the predetermined value α set in S2701 and the threshold of the reliability set in S2705 are the same as those described with reference to FIG. 11 in the first embodiment, the detailed descriptions thereof will be omitted.

As described above, the image pickup apparatus according to the present embodiment performs the perspective conflict determination of the central ranging area not based on the central ranging area but based on the peripheral ranging area. Thus, it is possible to suppress the poor operation which once passes through the main object and then returns again to the position of obtaining the in-focusing of the main object, and it is thus possible to perform the focus adjustment smoothly.

Although the present embodiment has been described based on the arrangement illustrated in FIG. 17A, it may be possible to use the arrangement of the ranging areas as illustrated in FIG. 17B. Further, as in the fourth embodiment, when the occurrence of the perspective conflict is determined in both the horizontal and vertical directions and it is determined that the perspective conflicts occur in both the directions, it may be possible to apply the perspective conflict determination of the present embodiment to the control method of selecting the oblique-direction ranging area. More specifically, in the respective perspective conflict determinations in S2306 and S2307 of FIG. 23 in the fourth embodiment, if it is controlled not to perform the perspective conflict determination shown in FIG. 11 but to perform the perspective conflict determination shown in FIG. 27, then the above controlling can be achieved. Moreover, as the perspective conflict determination means, it may be possible not to use either one of the perspective conflict determinations shown in FIGS. 11 and 27 but to use both of the perspective conflict determinations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro-processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (PAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-118661, filed Jun. 9, 2014, which is hereby incorporated by reference herein in its entirety.

What is claimed is:

1. A focus adjustment apparatus comprising:
an obtaining unit configured to obtain a plurality of image signals generated by photoelectrically converting object light which passed through different division areas of an exit pupil of an image pickup optical system;
a detection unit configured to detect a defocus amount of the image pickup optical system on the basis of the plurality of image signals obtained by the obtaining unit;
an area setting unit configured to set a plurality of areas including a predetermined area to be used for a focus adjustment of the image pickup optical system, as areas of the plurality of image signals to be used for detecting the defocus amount;
a control unit configured to generate a focus adjustment signal for performing the focus adjustment of the image pickup optical system, on the basis of the defocus amount detected in the predetermined area; and
a perspective conflict determination unit configured to determine whether or not a perspective conflict occurs in the predetermined area, according to the defocus amount detected in each area of at least more than two areas set by the area setting unit, wherein
in a case where it is determined by the perspective conflict determination unit that the perspective conflict occurs in the predetermined area, the control unit changes the area to be used for the focus adjustment of the image pickup optical system from the predetermined area to any of other areas set by the area setting unit, according to the defocus amount detected from each area.

2. The focus adjustment apparatus according to claim 1, wherein the plurality of areas include the predetermined area, and at least a first area and a second area of which centers of visual field are shifted by a predetermined amount in mutually opposite directions in regard to a center of visual field of the predetermined area.

3. The focus adjustment apparatus according to claim 2, wherein a condition by which it is determined that the perspective conflict occurs in the predetermined area includes at least a condition that an absolute value of the defocus amount detected in the predetermined area is equal to or lower than a predetermined value, a condition that absolute values of the defocus amounts detected in the first area and the second area are equal to or higher than the absolute value of the defocus amount detected in the predetermined area, and a condition that signs of the defocus amounts detected in the first area and the second area are mutually opposite to each other.

4. The focus adjustment apparatus according to claim 2, wherein a condition by which it is determined that the perspective conflict occurs in the predetermined area includes at least a condition that an absolute value of the defocus amount detected in the first area is equal to or lower than a predetermined value, a condition that absolute values of the defocus amounts detected in the predetermined area and the second area are equal to or higher than the absolute value of the defocus amount detected in the first area, a condition that the absolute value of the defocus amount detected in the second area is equal to or higher than the absolute value of the defocus amount detected in the predetermined area, and a condition that signs of the defocus amounts detected in the predetermined area and the second area are the same.

5. The focus adjustment apparatus according to claim 2, wherein the area to be changed from the predetermined area in the case where it is determined that the perspective conflict occurs in the predetermined area is, in at least the first area and the second area, the area in which the defocus amount indicating a closest range has been detected.

6. The focus adjustment apparatus according to claim 2, wherein the plurality of areas further include a third area and a fourth area of which centers of visual field are shifted by a predetermined amount in mutually opposite directions in regard to the center of visual field of the predetermined area in a direction perpendicular to the straight line connecting the centers of visual field of the first area and the second area with each other, and at least four fifth areas of which centers of visual field are shifted by predetermined amounts in respective opposite directions to the centers of visual field of the first area and the second area in the direction perpendicular to the straight line connecting the centers of visual field of the first area and the second area with each other.

7. The focus adjustment apparatus according to claim 6, wherein
   the perspective conflict determination unit determines whether or not the perspective conflict occurs in the predetermined area on the basis of the defocus amounts detected in the first area and the second area, and determines whether or not the perspective conflict occurs in the predetermined area on the basis of the defocus amounts detected in the third area and the fourth area, and
   in accordance with the determination that the perspective conflict occurs in the predetermined area on the basis of at least any of the defocus amounts detected in the first area and the second area and the defocus amounts detected in the third area and the fourth area, the control unit changes the area to be used for the focus adjustment of the image pickup optical system from the predetermined area to any of the first, second, third, fourth and fifth areas.

8. The focus adjustment apparatus according to claim 7, wherein, in a case where it is determined by the perspective conflict determination unit that the perspective conflict occurs in the predetermined area on the basis of the defocus amounts detected in the first area and the second area and that the perspective conflict occurs in the predetermined area on the basis of the defocus amounts detected in the third area and the fourth area, the control unit changes the area to be used for the focus adjustment of the image pickup optical system from the predetermined area to any of the fifth areas.

9. The focus adjustment apparatus according to claim 8, wherein the fifth area to which the area to be used for the focus adjustment of the image pickup optical system is changed from the predetermined area is the fifth area which is adjacent to both the area, in the first area and the second area, in which the defocus amount indicating a closest range has been detected and the area, in the third area and the fourth area, in which the defocus amount indicating a closest range has been detected.

10. The focus adjustment apparatus according to claim 8, wherein a condition of the determination of the perspective conflict to be performed in the case where the area to be used for the focus adjustment of the image pickup optical system is changed from the predetermined area to any of the fifth areas includes at least a condition that an absolute value of the defocus amount detected in the predetermined area is equal to or lower than a predetermined value, a condition that absolute values of the defocus amounts detected in the first area, the second area, the third area and the fourth area are equal to or higher than the absolute value of the defocus amount detected in the predetermined area, a condition that signs of the defocus amounts detected in the first area and the second area are opposite to each other, and a condition that signs of the defocus amounts detected in the third area and the fourth area are opposite to each other.

11. The focus adjustment apparatus according to claim 8, wherein a condition of the determination of the perspective conflict to be performed in the case where the area to be used for the focus adjustment of the image pickup optical system is changed from the predetermined area to any of the fifth areas includes at least a condition that absolute values of the defocus amounts detected in the first area and the third area are equal to or lower than a predetermined value, a condition that absolute values of the defocus amounts detected in the predetermined area and the second area are equal to or higher than the absolute value of the defocus amount detected in the first area, a condition that absolute values of the defocus amounts detected in the predetermined area and the fourth area are equal to or higher than the absolute value of the defocus amount detected in the third area, and a condition that signs of the defocus amounts detected in the predetermined area, the second area and the fourth area are respectively the same.

12. The focus adjustment apparatus according to claim 1, wherein the control unit stores identification information of the area to be used for the focus adjustment of the image pickup optical system, and changes the identification information according to the change of the area to be used for the focus adjustment of the image pickup optical system.

13. The focus adjustment apparatus according to claim 2, further comprising a unit configured to obtain information of a photographing mode of an object when the plurality of image signals are generated, wherein
   the area setting unit changes and sets arrangement positions of the plurality of areas according to the obtained information of the photographing mode.

14. The focus adjustment apparatus according to claim 2, further comprising a unit configured to obtain information of an object detected on the basis of the image signal obtained from the plurality of image signals, wherein
   the area setting unit changes and sets arrangement positions of the plurality of areas according to the detection of the object indicated by the obtained information.

15. The focus adjustment apparatus according to claim 13, wherein the plurality of areas set by changing the arrangement positions are the areas which are set such that the areas other than the predetermined area are contained in the predetermined area.

16. An image pickup apparatus comprising:
   an image pickup optical system configured to form an optical image of an object;
   an imaging unit configured to generate a plurality of image signals by photoelectrically converting object light which passed through different division areas of an exit pupil of the image pickup optical system;
   a detection unit configured to detect a defocus amount of the image pickup optical system on the basis of the plurality of image signals generated by the imaging unit;
   an area setting unit configured to set a plurality of areas including a predetermined area to be used for a focus adjustment of the image pickup optical system, as areas of the plurality of image signals to be used for detecting the defocus amount;
   a control unit configured to perform the focus adjustment of the image pickup optical system, on the basis of the defocus amount detected in the predetermined area; and
   a perspective conflict determination unit configured to determine whether or not a perspective conflict occurs in the predetermined area, according to the defocus amount detected in each area of at least more than two areas set by the area setting unit, wherein in a case where it is determined by the perspective conflict determination unit that the perspective conflict occurs in the predetermined area, the control unit changes the area to be used for the focus adjustment of the image pickup optical system from the predetermined area to any of other areas set by the area setting unit, according to the defocus amount detected from each area.

17. The image pickup apparatus according to claim 16, wherein the imaging unit further comprises a pupil division unit configured to divide the exit pupil of the image pickup optical system, the pupil division unit is a microlens array which is arranged on an image pickup plane of the imaging unit, and a plurality of pixels correspond to a microlens of the microlens array.

18. A focus adjustment method comprising:

obtaining a plurality of image signals generated by photoelectrically converting object light which passed through different division areas of an exit pupil of an image pickup optical system;

detecting a defocus amount of the image pickup optical system on the basis of the plurality of obtained image signals;

setting a plurality of areas including a predetermined area to be used for a focus adjustment of the image pickup optical system, as areas of the plurality of image signals to be used for detecting the defocus amount;

generating a focus adjustment signal for performing the focus adjustment of the image pickup optical system, on the basis of the defocus amount detected in the predetermined area; and determining whether or not a perspective conflict occurs in the predetermined area, according to the defocus amount detected in each set area of at least more than two areas, wherein in a case where it is determined that the perspective conflict occurs in the predetermined area, the area to be used for the focus adjustment of the image pickup optical system is changed from the predetermined area to any of other set areas, according to the defocus amount detected from each area.

19. A non-transitory computer-readable storage medium of storing a program for causing a computer to perform the focus adjustment method according to claim 18.

* * * * *